United States Patent [19]

Nakajima et al.

[11] Patent Number: 5,680,606
[45] Date of Patent: Oct. 21, 1997

[54] APPARATUS AND METHOD FOR CREATING MEMBERSHIP FUNCTIONS

[75] Inventors: Hiroshi Nakajima; Toshimi Kudo; Motoji Hayashi, all of Kyoto, Japan

[73] Assignee: Omron Corporation, Japan

[21] Appl. No.: 170,250

[22] PCT Filed: Sep. 29, 1992

[86] PCT No.: PCT/JP92/01245

§ 371 Date: Dec. 22, 1993

§ 102(e) Date: Dec. 22, 1993

[87] PCT Pub. No.: WO93/07575

PCT Pub. Date: Apr. 15, 1993

[30] Foreign Application Priority Data

| Sep. 30, 1991 | [JP] | Japan | 3-251509 |
| Oct. 4, 1991 | [JP] | Japan | 3-257992 |
| Dec. 5, 1991 | [JP] | Japan | 3-321947 |

[51] Int. Cl.$^6$ ................................ G06F 17/30
[52] U.S. Cl. .................. 395/604; 395/605; 395/61
[58] Field of Search .................. 364/DIG. 1, DIG. 2; 395/51, 61, 600, 602, 603, 604, 605

[56] References Cited

U.S. PATENT DOCUMENTS

| 5,267,348 | 11/1993 | Someya et al. | 395/61 |
| 5,422,984 | 6/1995 | Iokibe et al. | 395/51 |
| 5,467,270 | 11/1995 | Matsumoto | 364/403 |
| 5,471,559 | 11/1995 | Yasunobu et al. | 395/61 |
| 5,471,677 | 11/1995 | Imanaka | 395/600 |

FOREIGN PATENT DOCUMENTS

| 3168869 | 7/1991 | Japan . |
| 3232064 | 10/1991 | Japan . |
| 3260769 | 11/1991 | Japan . |
| 5-506776 | 4/1993 | Japan . |

OTHER PUBLICATIONS

APS Text Search & Retrieval Classroom Manual, USPTO, May 1987, pp. 2–37 through 2–39.

Lee, J.H. et al. "Enhancing the Fuzzy Set Model for High Quality Document Rankings." Microprocessing & Microprogramming, vol. 35, No. 1/5, Sep. 1992, pp. 337–344.

Nomura, T. et al. "Generating Ambiguous Attributes for Fuzzy Queries." IEEE International Conference on Fuzzy Systems, 12 Mar. 1992, San Diego, CA, pp. 753–760.

Bosc, P. et al. "Flexible Selection Among Objects: A Framework Based on Fuzzy Sets." ACM SIGIR 11th International Conference on Research & Development in Information Retrieval, 15 Jun. 1988, pp. 433–449.

Zemankova, M. "Filip: A Fuzzy Intelligent Information System with Learning Capabilities." Information Systems, vol. 14, No. 6, 1989, pp. 473–486.

(List continued on next page.)

*Primary Examiner*—Thomas G. Black
*Assistant Examiner*—Maria N. Von Buhr
*Attorney, Agent, or Firm*—Dickstein Shapiro Morin & Oshinsky, LLP

[57] ABSTRACT

Data stored in a data base (21) includes crisp numbers expressed by definite numerical values, fuzzy numbers expressed by attaching "about" to numerical values, and fuzzy labels represented by fuzzy language. Status codes are used to distinguish these types of data, and data is stored in the data base (21) upon attaching the status codes thereto. Membership function data accessed using data and the status codes attached thereto is stored in a fuzzy data dictionary (22). When a retrieval condition has been given, data related to this retrieval condition is retrieved in the data base (21). If this data is data involving a fuzzy concept, the membership function data corresponding to this data is extracted from the fuzzy data dictionary (22). Fuzzy-retrieval execution means (20) calculates the degree of membership of the membership function data with respect to the retrieval condition and outputs the result through an output unit (24).

18 Claims, 28 Drawing Sheets

OTHER PUBLICATIONS

Kacprzyk, J. et al. "FQUERY 111+: A 'Human Consistent' Database Querying System Based on Fuzzy Logic with Linguistic Quantifiers." Information Systems, vol. 14, No. 6, 1989, pp. 443–453.

"Fuzzy Database Retrieval and Manipulation Language," Electronic Communication Institute Technical Report, Jan. 27, 1976, Shingakugiho, vol. 78, No. 233, pp. 65–72.

"Perspectives and Trends of Fuzzy Databases," Electronic Communication Institute Technical Report, Jan. 27, 1976, Shingakugiho, vol. 78, No. 233, pp. 207–214.

"A Relational Database Extended By Application Of Fuzzy Set Theory And Linguistic Variables," Computers and Artificial Intelligence, vol. 8, No. 2, 1989, Le. T. Young, et al., pp. 153–168.

"Perspectives of Fuzzy Databases," Motohide Umano, et al., Department of Precision Engineering, Faculty of Engineering, Osaka University, vol. 3, No. 1, 1991, pp. 2–14.

"A Fuzzy Database System For Ambiguous Queries," Takahiko Nomura, et al., Faculty of Science and Technology, Keio University, 1991, pp. 91–98.

Fig. 4

INPUT INFORMATION

| NAME OF MACHINE TYPE | PRICE OF MAIN BODY (IN 10,000.- YEN UNITS) | PROCESSING SPEED (MIPS) | MEMORY CAPACITY (MB) | NAME OF MANUFACTURER |
|---|---|---|---|---|
| VV | 150 | 4 | 16 | COMPANY A |
| WW | ABOUT 250 | ABOUT 7 | 32 | COMPANY B |
| XX | 300 | ABOUT 30 | 64 | COMPANY C |
| YY | ABOUT 500 | ON THE ORDER OF THAT OF MACHINE A | 128 | COMPANY D |
| ZZ | ABOUT 300 | VERY FAST | 30 | COMPANY E |

Fig. 5

DATA BASE

| NAME OF MACHINE TYPE | PRICE OF MAIN BODY (IN 10,000.- YEN UNITS) | STATUS | PROCESSING SPEED (MIPS) | STATUS | MEMORY CAPACITY (MB) | STATUS | NAME OF MANUFACTURER |
|---|---|---|---|---|---|---|---|
| VV | 150 | (CRISP NUMBER) | 4 | (CRISP NUMBER) | 16 | (CRISP NUMBER) | COMPANY A |
| WW | 250 | (FUZZY NUMBER) | 7 | (FUZZY NUMBER) | 32 | (CRISP NUMBER) | COMPANY B |
| XX | 300 | (CRISP NUMBER) | 30 | (FUZZY NUMBER) | 64 | (CRISP NUMBER) | COMPANY C |
| YY | 500 | (FUZZY NUMBER) | 2 | (FUZZY LABEL) | 128 | (CRISP NUMBER) | COMPANY D |
| ZZ | 300 | (FUZZY NUMBER) | 1 | (FUZZY LABEL) | 30 | (CRISP NUMBER) | COMPANY E |

Fig.6

| FUZZY LABEL NAME | FUZZY LABEL NUMBER | MEMBERSHIP FUNCTION COORDINATES |
|---|---|---|
| VERY FAST | 1 | 45,50 |
| FAST | 2 | 30,35 |
| MEDIUM | 3 | 15,20,30,35 |
| SLOW | 4 | 15,20 |
| VERY SLOW | 5 | 5,7 |
| VERY HIGH | 1 | |
| HIGH | 2 | |
| MEDIUM | | |

| ATTRIBUTE | FUZZY NUMBER RATIO |
|---|---|
| PRICE OF MAIN BODY | 20 |
| PROCESSING SPEED | 10 |

FUZZY DATA DICTIONARY

Fig.12

| NAME OF MACHINE TYPE | DEGREE OF MEMBERSHIP IN PRICE OF MAIN BODY | DEGREE OF MEMBERSHIP IN PROCESSING SPEED |
|---|---|---|
| V V | 100 | 0 |
| W W | 63 | 0 |
| X X | 20 | 62 |
| Y Y | 0 | 43 |
| Z Z | 39 | 100 |

Fig. 13

DATA BASE

| NAME OF MACHINE TYPE | PRICE OF MAIN BODY | | | PROCESSING SPEED | | | MEMORY CAPACITY | | | NAME OF MANUFAC-TURER |
|---|---|---|---|---|---|---|---|---|---|---|
| | (IN 10,000YEN UNITS) | STATUS | DEGREE OF CREDI-BILITY | (MIPS) | STATUS | DEGREE OF CREDI-BILITY | (MB) | STATUS | DEGREE OF CREDI-BILITY | |
| VV | 150 | (CRISP NUMBER) | 100 | 4 | (CRISP NUMBER) | 100 | 16 | (CRISP NUMBER) | 100 | COMPANY A |
| WW | 250 | (FUZZY NUMBER) | 95 | 7 | (FUZZY NUMBER) | 90 | 34 | (CRISP NUMBER) | 100 | COMPANY B |
| XX | 300 | (CRISP NUMBER) | 100 | 30 | (FUZZY NUMBER) | 95 | 64 | (CRISP NUMBER) | 100 | COMPANY C |
| YY | 500 | (FUZZY NUMBER) | 80 | 2 | (FUZZY LABEL) | 70 | 128 | (CRISP NUMBER) | 100 | COMPANY D |
| ZZ | 300 | (FUZZY NUMBER) | 65 | 1 | (FUZZY LABEL) | 30 | 30 | (CRISP NUMBER) | 100 | COMPANY E |

Fig. 15

| NAME OF MACHINE TYPE | PRICE OF MAIN BODY | | | PROCESSING SPEED | | |
|---|---|---|---|---|---|---|
| | DEGREE OF CREDIBILITY | DEGREE OF SIGNIFI- CANCE | DEGREE OF IMPORTANCE | DEGREE OF CREDIBILITY | DEGREE OF SIGNIFI- CANCE | DEGREE OF IMPORTANCE |
| V V | 100 | 80 | 80 | 100 | 90 | 90 |
| W W | 95 | 80 | 76 | 90 | 90 | 81 |
| X X | 100 | 80 | 80 | 95 | 90 | 85.5 |
| Y Y | 80 | 80 | 64 | 70 | 90 | 63 |
| Z Z | 65 | 80 | 52 | 30 | 90 | 27 |

Fig. 16

| NAME OF MACHINE TYPE | PRICE OF MAIN BODY | | PROCESSING SPEED | | DEGREE OF CONCURRENCE |
|---|---|---|---|---|---|
| | DEGREE OF MEMBERSHIP | DEGREE OF IMPORTANCE | DEGREE OF MEMBERSHIP | DEGREE OF IMPORTANCE | |
| V V | 100 | 80 | 0 | 90 | 47.1 |
| W W | 63 | 76 | 0 | 81 | 30.4 |
| X X | 20 | 100 | 62 | 85.5 | 39.4 |
| Y Y | 0 | 80 | 43 | 63 | 18.9 |
| Z Z | 39 | 65 | 100 | 27 | 56.9 |

Fig.19

DATA BASE

| No | NAME | ADDRESS | ANNUAL INCOME | NEXT SCHEDULED AUTOMOBILE INSPECTION | AGE OF SPOUSE | AGE OF DEPENDENT | PRESENT MODEL |
|---|---|---|---|---|---|---|---|
| $U_1$ | MR.A | ...OSAKA | 6,000,000 YEN | '91/12 | 40 | 15 | 4-DOOR SEDAN |
| $U_2$ | MR.B | ...KYOTO | 10,000,000 YEN | '92/10 | 50 | 18 | 4-DOOR SEDAN |
| $U_3$ | MR.C | ...KOBE | 7,000,000 YEN | '93/2 | 30 | 5 | 2-DOOR SEDAN |
|  |  |  |  |  |  |  |  |

Fig.20

RETRIEVAL CONDITIONS STORED

| RETRIEVAL CONDITION R1 |
| --- |
| RETRIEVAL CONDITION R2 (TIME FOR NEXT SCHEDULED INSPECTION IS NEAR) |
| RETRIEVAL CONDITION R3 (ANNUAL INCOME IS HIGH) |
| RETRIEVAL CONDITION R4 |
| RETRIEVAL CONDITION R5 |
| RETRIEVAL CONDITION R6 |
| RETRIEVAL CONDITION R7 (AGE OF DEPENDENT IS ABOUT 18) |
| RETRIEVAL CONDITION R8 |

Fig. 21

SELECTED RETRIEVAL CONDITIONS

| RETRIEVAL CONDITION R2 (TIME FOR NEXT SCHEDULED INSPECTION IS NEAR) |
| --- |
| RETRIEVAL CONDITION R3 (ANNUAL INCOME IS HIGH) |
| RETRIEVAL CONDITION R7 (AGE OF DEPENDENT IS ABOUT 18) |

Fig. 22

RESULTS OF RETRIEVAL

| No | NAME | ADDRESS | ANNUAL INCOME | NEXT SCHEDULED AUTOMOBILE INSPECTION | AGE OF SPOUSE | AGE OF DEPENDENT | PRESENT MODEL |
| --- | --- | --- | --- | --- | --- | --- | --- |
| $U_1$ | MR. A | ...OSAKA | 6,000,000 YEN | '91/12 | 40 | 15 | 4-DOOR SEDAN |
| $U_2$ | MR. B | ...KYOTO | 10,000,000 YEN | '92/10 | 50 | 18 | 4-DOOR SEDAN |

Fig.23

DEGREE OF MEMBERSHIP

| No | RETRIEVAL CONDITION R2 | RETRIEVAL CONDITION R3 | RETRIEVAL CONDITION R7 |
|---|---|---|---|
| $U_1$ | (0.8) | 0.4 | 0.5 |
| $U_2$ | 0.2 | (0.9) | (1.0) |

Fig.24

MR. A
  "VERY LIKELY TO PURCHASE NEW CAR SINCE INSPECTION IS DUE SOON."
 (DEGREE OF MEMBERSHIP OF RETRIEVAL CONDITION R2: 0.8)

MR. B
  "LIKELY TO PURCHASE CAR FOR CHILD."
 (DEGREE OF MEMBERSHIP OF RETRIEVAL CONDITION R7: 1.0)

MR. B
  "VERY LIKELY TO PURCHASE CAR BECAUSE OF SUFFICIENT FUNDS."
 (DEGREE OF MEMBERSHIP OF RETRIEVAL CONDITION R3: 0.9)

APPARATUS AND METHOD FOR CREATING MEMBERSHIP FUNCTIONS

TECHNICAL FIELD

This invention relates to a fuzzy retrieval apparatus and method, as well as an apparatus for creating membership functions.

BACKGROUND ART

Fuzzy retrieval is a retrieval method that allows fuzziness of data stored in a data base or fuzziness of retrieval conditions.

Though a conventional fuzzy retrieval apparatus allows the setting or entry of retrieval conditions by fuzzy information (e.g., a fuzzy language), data stored in a data base is limited to definite numerical values (crisp numbers) or information.

Fuzzy retrieval in the conventional fuzzy retrieval apparatus is executed in the following manner: A given retrieval condition is expressed by a membership function. From the data that has been stored in a data base, the data that corresponds to the retrieval condition is read out and the degree of membership of the data that has been read out in association with the membership function representing the retrieval condition is calculated. Processing for calculating degree of membership is executed with regard to all retrieval conditions and with regard to all data corresponding to the retrieval conditions. Data having fairly good conformity to the retrieval conditions is eventually selected from the viewpoint of whether the value of a degree of membership thus obtained is highest, greater than a predetermined value or relatively high.

In a case where it is attempted to register data (fuzzy data) having fuzziness in a data base, the fuzzy data must be converted into crisp data in the conventional fuzzy retrieval apparatus. For example, with regard to fuzzy information "young in age", an operation is performed in which this is registered in a data base upon converting it into the crisp data "15 to 25 years of age".

According to conventional fuzzy retrieval, data conforming to given retrieval conditions is fetched from the data base as mentioned above. However, the user must make a judgment regarding the results of retrieval thus obtained. For example, it is necessary for the user himself to observe the data of the retrieved results and then make a judgment as to why such retrieved results were obtained and what action should be taken with respect to these retrieved results. If such decision making is delayed, there may be instances in which the reason for performing the retrieval is rendered meaningless. For example, if such a delay occurs in the search of a customer data base, speedy action of the user with regard to a customer is delayed and a promising customer may fail to be acquired.

In fuzzy reasoning processing which includes the above-described fuzzy retrieval processing, use of a membership function in order to express the fuzzy information is unavoidable. Creation of the membership function generally is performed on the basis of experimentation or experience. There are also situations in which a new membership function is created based upon a membership function that already exists. In either case, the creation of the membership function is carried out by hand. The problem that arises is expenditure of much labor and time. In addition, when a membership function is created by hand, the membership function created reflects a difference among individuals. This leads to a problem in that it is not always possible to attain a standard basis for making judgments.

DISCLOSURE OF THE INVENTION

An object of the present invention is to make it possible to store fuzzy information in a data base in its own form without converting the fuzzy information into crisp data.

Another object of the present invention is to make it possible to save both definite crisp information and vague fuzzy information in a data base in mixed form.

A further object of the present invention is to provide a system capable of assisting a user in decision making with regard to results of fuzzy retrieval.

A further object of the present invention is to provide an apparatus that utilizes an existing membership function to create a new membership function automatically and in a short period of time, thereby reducing human labor and avoiding a situation in which a difference among individuals is reflected in the membership function.

According to a first feature of the present invention, a fuzzy retrieval apparatus is constructed as follows:

Specifically, a fuzzy retrieval apparatus according to the present invention comprises a data base in which data serving as a basis for retrieval processing and status information indicating whether this data involves a fuzzy concept or not are stored in correlated form, a fuzzy data dictionary, which is capable of being accessed using at least one of the data involving a fuzzy concept and status information corresponding thereto stored in the data base, in which data relating to a membership function for expressing a membership function suggested by this data has been stored, and retrieval processing means for fetching data, which has been stored in the data base, in accordance with a given retrieval condition and, in a case where this data is indicated as being data involving a fuzzy concept by the corresponding status information, for fetching data relating to a corresponding membership function upon referring to the fuzzy data dictionary, and obtaining whether this data conforms to the retrieval condition, or the degree to which it conforms, by a prescribed operation between a membership function represented by the data relating to this membership function and the retrieval condition.

A fuzzy retrieval method according to the present invention uses an apparatus having a data base in which data serving as a basis for retrieval processing and status information indicating whether this data involves a fuzzy concept or not are stored beforehand in correlated form, and a fuzzy data dictionary, which is capable of being accessed using at least one of the data involving a fuzzy concept and status information corresponding thereto stored in the data base, in which data relating to a membership function for expressing a membership function suggested by this data has been stored in advance, the method including the steps of fetching data, which has been stored in the data base, in accordance with a given retrieval condition and, in a case where this data is indicated as being data involving a fuzzy concept by the corresponding status information, fetching data relating to a corresponding membership function upon referring to the fuzzy data dictionary, and obtaining whether this data conforms to the retrieval condition, or the degree to which it conforms, by a prescribed operation between a membership function represented by the data relating to this membership function and the retrieval condition.

In a preferred embodiment, input means for entering the retrieval condition is provided.

Further, output means for outputting data obtained by the retrieval processing means is provided.

In another embodiment, the status information indicates a distinction between a fuzzy number, which indicates that data is a numerical value to which "about" has been attached, and a fuzzy label represented by fuzzy language.

The above-described fuzzy data dictionary further stores data relating to a membership function for expressing a membership function suggested by a retrieval condition involving a fuzzy concept.

In a case where a retrieval condition involves a fuzzy concept, the retrieval processing means fetches data relating to a membership function corresponding to this retrieval condition from the fuzzy data dictionary and performs a prescribed operation between the membership function representing the retrieval condition and a membership function corresponding to the data fetched from the data base.

The above-mentioned prescribed operation is a MIN-MAX operation, by way of example.

In accordance with the present invention, status information is attached to the data stored in the data base. The status information indicates whether the data involves a fuzzy concept or not. With regard to data involving a fuzzy concept, the membership function data representing this is stored in the fuzzy data dictionary. Accordingly, if the data that has been stored in the data base involves a fuzzy concept, a membership function can be looked up using the fuzzy data dictionary and this can be used in retrieval processing.

Thus, in accordance with the invention, data involving a fuzzy concept can be stored in the data base as is. Moreover, this data can be utilized in fuzzy retrieval. Definite crisp information and vague fuzzy information can be stored in the data base in mixed form.

In another embodiment of the invention, data representing the degree of credibility of data that has been stored in the data base is stored in the data base in advance. This degree of credibility also is read out of the data base and is included in the prescribed operation.

The reliability of the results of retrieval is improved by adding the degree of credibility to the data. Even if the degree of credibility is low, the latest data can be registered in the data base at an early stage and fuzzy retrieval can be carried out based upon the latest data.

In a further embodiment of the present invention, when data representing degree of attached significance is given together with the retrieval conditions, the given degree of attached significance is included in the prescribed operation.

Further, data of attribute information related to an item is stored together with the degree of credibility in the data base beforehand for each and every item. When retrieval conditions and data representing degree of attached significance have been given, degree of membership of attribute information data with respect to the retrieval condition is calculated in the prescribed operation, and degree of concurrence is calculated for each and every item from the degree of credibility, degree of attached significance and degree of membership.

Thus, in accordance with the invention, the volition of the user is reflected by the input data, namely the degree of attached significance, the reliability of data in the data base is reflected by data that is the degree of credibility, and appropriate retrieval can be achieved.

The present invention provides a data base used in a fuzzy retrieval apparatus, as well as an apparatus and method for creating the data base.

A data-base storage apparatus according to the invention stores, in correlated form, data serving as a basis for retrieval processing and status information indicating whether this data involves a fuzzy concept or not.

An apparatus for creating a data base according to the present invention comprises input means for entering data serving as a basis for retrieval processing, discriminating means for discriminating whether the data entered by the input means involves a fuzzy concept or not, and a data base for storing, in correlated form, data relating to the data entered by the input means and status information indicating whether the data is that involving a fuzzy concept discriminated by the discriminating means.

In a preferred embodiment, the apparatus for creating the data base further includes a fuzzy data dictionary in which data representing a membership function corresponding to data that involves a fuzzy concept entered by the input means is stored in advance, and data-base creation processing means for fetching, from the fuzzy data dictionary, data representing the membership function corresponding to the data entered by the input means when it is discriminated by the discriminating means that the data involves a fuzzy concept, and storing the data representing this membership function in the data base.

The discriminating means discriminates whether the entered data is a fuzzy number to which "about" has been attached or a fuzzy label represented by fuzzy language, and stores status information indicating the result of discrimination in the data base.

A method of creating a data base according to the present invention comprises the steps of accepting data, which serves as a basis for retrieval processing, entered through an input device, discriminating whether the data entered through the input device involves a fuzzy concept or not, and storing in memory, in correlated form, and in accordance with results of discrimination, data relating to the data entered through the input device and status information indicating whether the data is that involving a fuzzy concept that has been discriminated.

Preferably, data representing a membership function corresponding to data involving a fuzzy concept entered through the input device is stored beforehand in a fuzzy data dictionary and, when it is discriminated that the data entered through the input device involves the fuzzy concept, data representing the membership function corresponding to the data entered through the input device is fetched from the fuzzy data dictionary and the data representing this membership function is stored in the data base.

In accordance with the invention, a data base suitable for the above-described fuzzy retrieval is created.

In accordance with a second feature of the present invention, a fuzzy retrieval apparatus is constructed as follows:

Specifically, a fuzzy retrieval apparatus according to the invention comprises a data base in which data serving as a basis for retrieval processing is stored, retrieving means which, on the basis of degree of membership of data corresponding to a given retrieval condition, is for retrieving data conforming fairly closely to the retrieval condition in the data base, a first memory in which data representing an explanatory statement corresponding to a retrieval condition is stored, and means for reading out and outputting, from the memory, data representing an explanatory statement relating to all or some of the data retrieved by the retrieving means.

In a preferred embodiment, the fuzzy retrieval apparatus further comprises a second memory in which a plurality of retrieval conditions are stored in advance, and means for selecting retrieval conditions from the second memory and applying them to the retrieving means.

The fuzzy retrieval apparatus may have means for entering retrieval conditions to be applied to the retrieving means.

The output means preferably outputs an explanatory statement in relation to data for which degree of membership is higher than a prescribed value.

The output means preferably outputs degree of membership together with an explanatory statement.

In a preferred embodiment, the above-described fuzzy retrieval apparatus has means for executing accommodation processing in relation to all or some of the data retrieved by the retrieving means.

A fuzzy retrieval method according to the present invention comprises the steps of storing in advance, in a data base, data serving as a basis for retrieval processing, storing in advance, in a memory, data representing an explanatory statement corresponding to a retrieval condition and, when a retrieval condition has been given, calculating degree of membership of data corresponding to this retrieval condition, retrieving, in the data base, data conforming fairly closely to a retrieval condition based upon the degree of membership obtained, and reading out and outputting, from the memory, data representing an explanatory statement in relation to all or some of the data obtained by retrieval.

In accordance with the invention, an explanatory statement corresponding to results of retrieval is capable of assisting the decision making of the user.

An apparatus for creating membership functions according to a third feature of the present invention is constructed as follows:

Specifically, an apparatus for creating membership functions comprises a memory for storing data, which represents a membership function already created, in correlation with an identification number of the membership function, a plurality of operating means for executing a predetermined operation for membership function creation, means for entering an operation code representing a type of operation as well as an identification number of a membership function serving as a basis used in this operation, and means for performing control so as to select an operating means that corresponds to an operation code entered by the input means, read a membership function, which corresponds to the identification code of the membership function entered by the input means, out of the memory and cause the selected operating means to create a new membership function in which the membership-function data that has been read out serves as the basis.

The control means further stores data representing a newly created membership function in the memory with its identification code allocated thereto.

In accordance with the invention, a new membership function is created automatically, based on an existing membership function, in accordance with a predetermined arithmetic expression. Since the judgments and thoughts of the operator do not intervene in the creation of a new membership function, the new membership function is not affected by the volition of the operator.

Further, since the created new membership function is stored in the memory, this can be used in the creation of another new membership function as an existing membership function.

BRIEF DESCRIPTION OF THE DRAWINGS

FIG. 4 illustrates an example of input information;

FIG. 5 illustrates an example of the content of a data base;

FIG. 6 illustrates an example of the content of a fuzzy data dictionary;

FIG. 12 illustrates an example of degrees of membership obtained;

FIG. 13 illustrates an example of a data base according to a modification;

FIG. 15 illustrates degrees of importance obtained from degrees of credibility and degrees of attached significance;

FIG. 16 illustrates degrees of concurrence obtained from degrees of membership and degrees of importance;

FIG. 19 illustrates an example of a data base;

FIG. 20 illustrates an example of retrieval conditions that have been stored;

FIG. 21 illustrates an example of retrieval conditions that have been selected;

FIG. 22 illustrates an example of results of retrieval;

FIG. 23 illustrates an example of degrees of membership that have been obtained;

FIG. 24 illustrates examples of a displayed explanatory statements;

BEST MODE FOR CARRYING OUT THE INVENTION

First Embodiment

Figure 1:
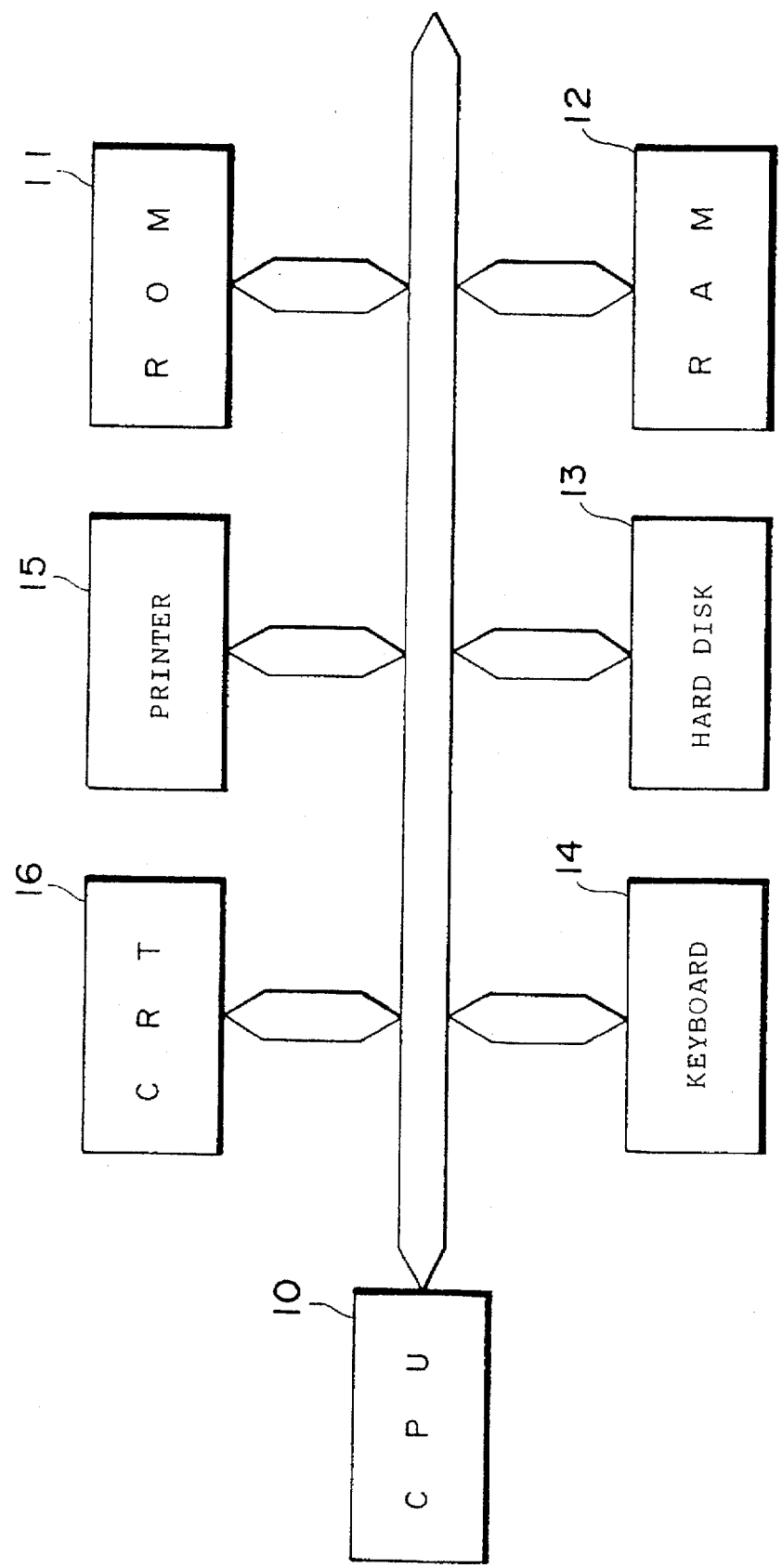
FIG. 1 is a block diagram illustrating the electrical configuration of a fuzzy retrieval apparatus according to first and second embodiments of the present invention.

FIG. 1 illustrates an example of the overall configuration of a fuzzy retrieval apparatus. The fuzzy retrieval apparatus is capable of being realized by a computer system and includes a CPU 10 for executing data-base creation processing and fuzzy retrieval processing, which will be described later in greater detail. A ROM 11, a RAM 12, a hard disk unit 13, a keyboard 14, a printer 15 and a CRT display unit 16 are connected to the CPU 10 via a system bus. The ROM 11 stores programs for data-base creation processing and fuzzy retrieval processing executed by the CPU 10 in accordance therewith. The RAM 12 is used as a work area and buffer area for various operations in the above-mentioned creation processing and retrieval processing. The hard disk unit 13 stores the data base and a fuzzy data dictionary. The keyboard 14 is used to enter input information for creation of the data base as well as retrieval conditions for fuzzy retrieval. The printer 15 and CRT display unit 16 output the results of fuzzy retrieval as visual information by printing the results on paper or displaying them on a screen.

Figure 2:
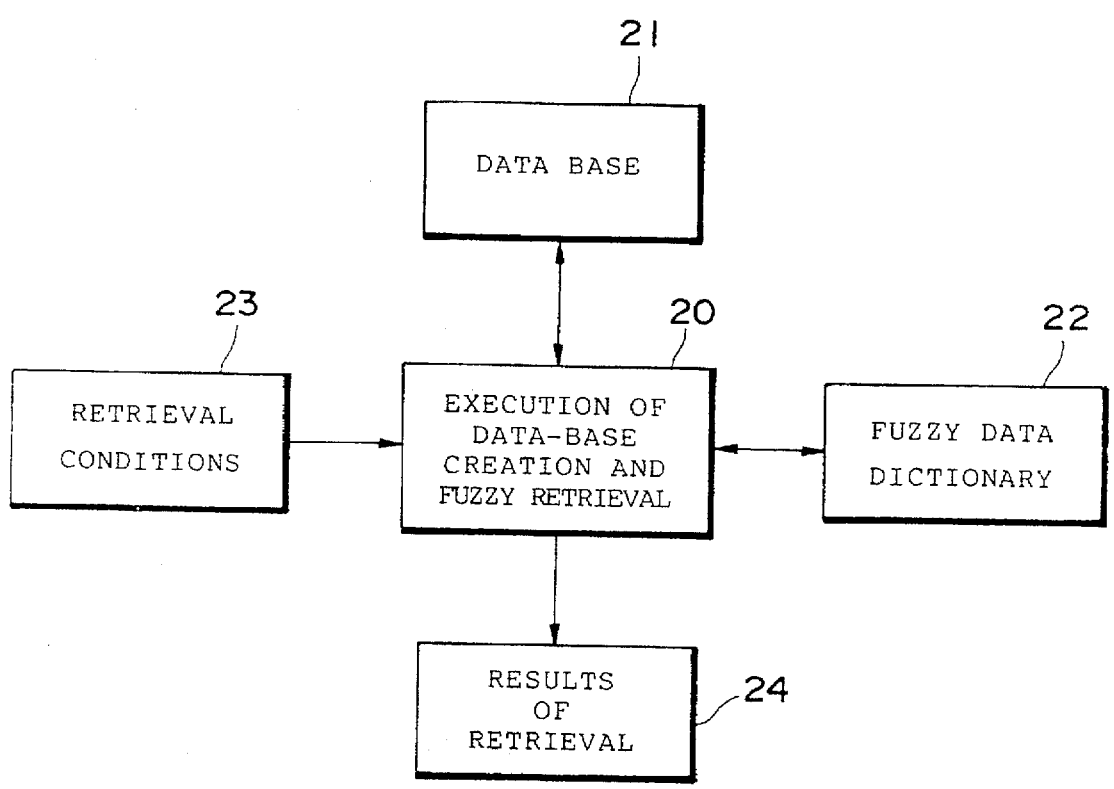
FIG. 2 is a functional block diagram showing a principal portion of the fuzzy retrieval apparatus according to the first embodiment.

In order to describe the processing for data base creation and the processing for fuzzy retrieval, FIG. 2 illustrates the necessary functions in a form extracted from the system shown in FIG. 1. Implementation 20 of data base creation and fuzzy retrieval is performed by the CPU 10. A data base 21 and fuzzy data dictionary 22 are provided in the hard disk unit 13. Retrieval conditions 23 are entered from the keyboard 14 and stored in the RAM 12. Retrieved results 24 are outputted from the printer 15 or CRT display unit 16.

Processing for creating a data base will now be described.

An example of information entered in order to create a data base is illustrated in FIG. 4. It is assumed here that a data base regarding computer devices will be created. The name of each machine shall be referred to as an "item". Information related to an item shall be referred to as an attribute. In this embodiment, attributes are the price of the main body of the device, processing speed, memory capacity and name of the manufacturer.

In this embodiment, information representing an attribute is capable of being entered in three forms. The first is entry of a definite numerical value, e.g., a price for the main body of "1,500,000 yen", a processing speed of "4 MIPS" (MIPS= million instructions per second), and a memory capacity of "16 MB", etc. These are referred to as crisp numbers. The second is entry of an approximate numerical value using the word "about", e.g., a price for the main body of "about 2,500,000 yen", a processing speed of "about 7 MIPS", etc. These are referred to as fuzzy numbers. The third is entry by a linguistic expression, e.g., a processing speed that is "on the order of that of Machine A" or "very fast", a manufacturer's name of "Company A", etc. Among these linguistic expressions (or items of linguistic information), fuzzy linguistic expressions such as "on the order of that of Machine A" and "very fast" are referred to as fuzzy labels.

FIG. 6 illustrates an example of a fuzzy data dictionary. There are predetermined fuzzy linguistic expressions, and fuzzy label numbers and membership function coordinates have been decided in correspondence with these fuzzy linguistic expressions (fuzzy label names). It goes without saying that fuzzy linguistic expressions used when attributes are entered in order to create a data base and fuzzy linguistic expressions used when retrieval conditions, described below, are entered are limited to those already registered in the fuzzy data dictionary. The membership function coordinates will be described later. Fuzzy number ratios also are stored in the fuzzy data dictionary and will be described later.

Figure 3:
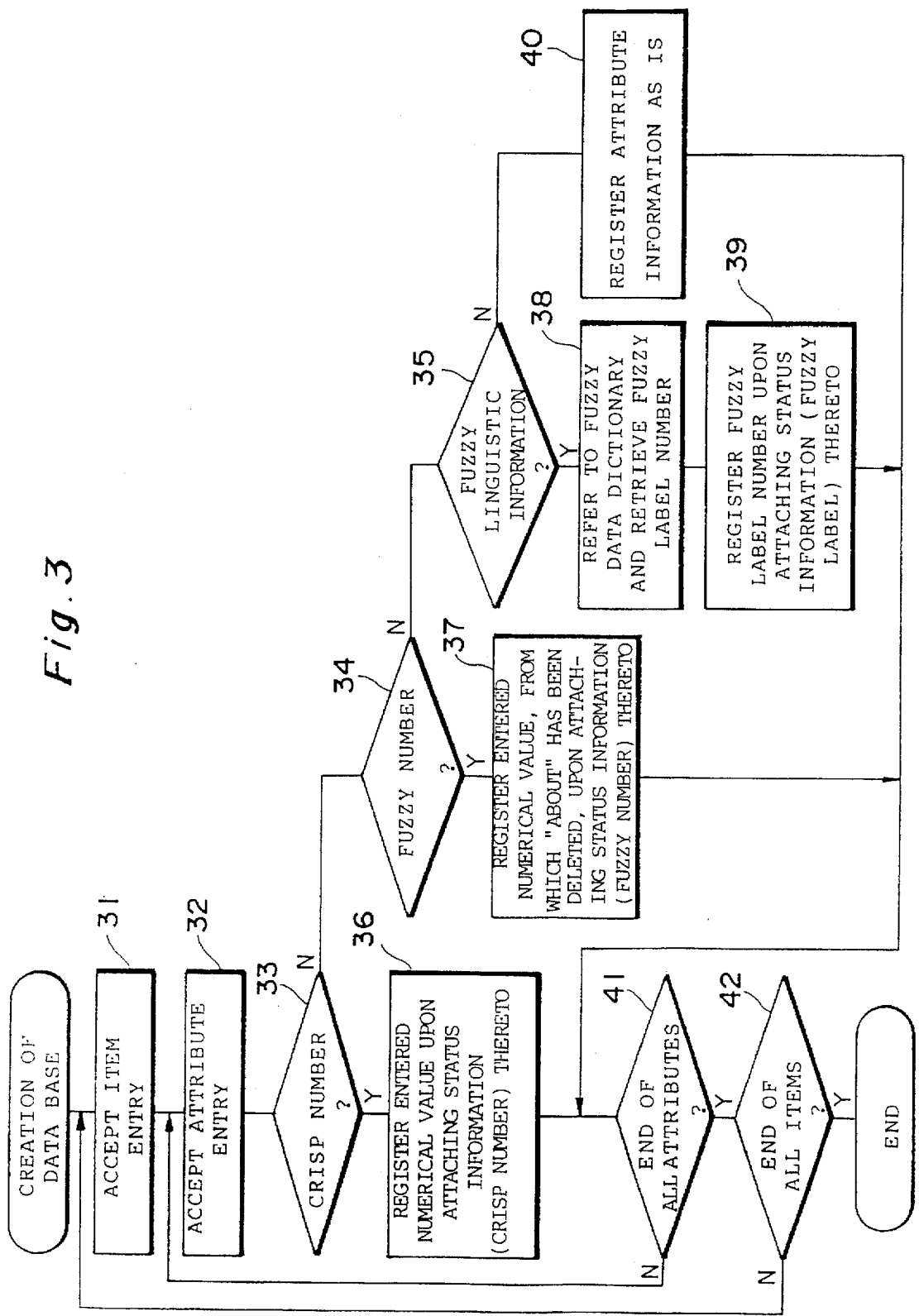
FIG. 3 is a flowchart showing processing for creating a data base.

FIG. 3 illustrates the flow of processing for creating a data base.

It will be assumed that the input information shown in FIG. 4 will be entered in order to create a data base. Further, an input of name of machine type, crisp numbers, fuzzy numbers and linguistic information (fuzzy labels) from the keyboard 14 is possible.

When information (name of machine type) regarding an item is entered, this is registered in the data base 21 (step 31). Items of information (price of main body, processing speed, memory capacity, manufacturer's name) regarding attributes are successively entered in relation to an entered name of machine type and these are stored in a buffer (step 32).

It is determined whether the entered attribute information is a crisp number, fuzzy number or fuzzy label (steps 33, 34, 35). If the attribute information is a price for the main body of "1,500,000 yen" or a processing speed of "4 MIPS", the information is a crisp number, as mentioned above. Therefore, the entered attribute information and codes representing the "crisp numbers" serving as status information regarding this information are registered in the data base 21 (step 36). In case of fuzzy information such as a price for the main body of "about 2,500,000 yen" and a processing speed of "about 7 MIPS", etc., "about" is deleted from the fuzzy numbers such as "about 2,500,000 yen" and "about 7 MIPS" and the fuzzy numbers are converted to crisp numbers. Crisp numbers thus obtained by conversion and "crisp number" codes serving as status information are registered at pertinent locations of the data base 21 (step 37). In a case where the entered attribute information is a fuzzy label such as that stating that processing speed is "on the order of that of Machine A" or "very fast", reference is made to the fuzzy data dictionary 22. A fuzzy label number representing an entered fuzzy label is read out of the fuzzy data dictionary 22 (step 38). The fuzzy label number read out is registered in a pertinent location of the data base 21 together with a code of the "fuzzy label" indicating the status information (step 39). In a case where the entered attribute information is definite linguistic information such as "Company A" and "Company B", this is stored in a pertinent location of the data base 21 as is or upon being converted into an appropriate code (step 40).

The processing of steps 33–40 described above is repeated whenever each unit of a plurality of units of attribute information is entered with regard to a single unit of item information (the name of the type of machine) (step 41). When the entry of all attribute information regarding a single unit of item information and the processing for registering this attribute information in the data base end, the program proceeds to entry and processing for the next unit of item information (step 42). If entry of attribute data relating to all item information and registration of this attribute information end, this completes the creation of the data base of the kind shown in FIG. 5.

Fuzzy retrieval processing will be described next.

Figure 7:
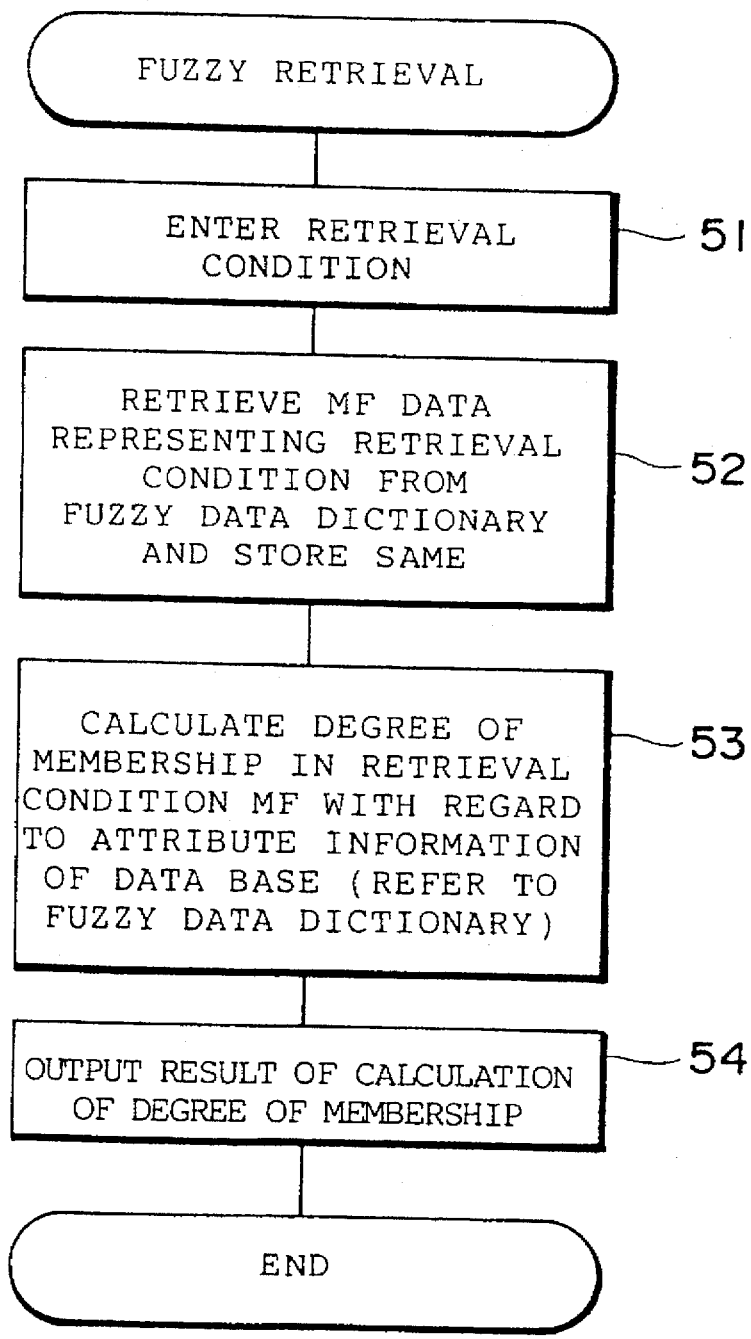
FIG. 7 is a flowchart illustrating fuzzy retrieval processing.

FIG. 7 illustrates the entire procedure of fuzzy retrieval processing. First, the retrieval conditions are entered from the keyboard 14 (step 51). In case of fuzzy retrieval, the retrieval conditions generally (but not necessarily always) are represented by fuzzy linguistic information. In order to simplify the description, it will be assumed that retrieval conditions are set as follows solely with regard to two attributes, namely price of the main body and processing speed:

Retrieval Conditions: Price of main body is "low Speed of main body is "fast"

In a case where the entered retrieval conditions are represented by fuzzy linguistic information, reference is made to the fuzzy data dictionary 22, a membership function (MF) representing these retrieval conditions is created and the membership function is stored in the buffer (RAM 12) (step 52).

Figure 8:
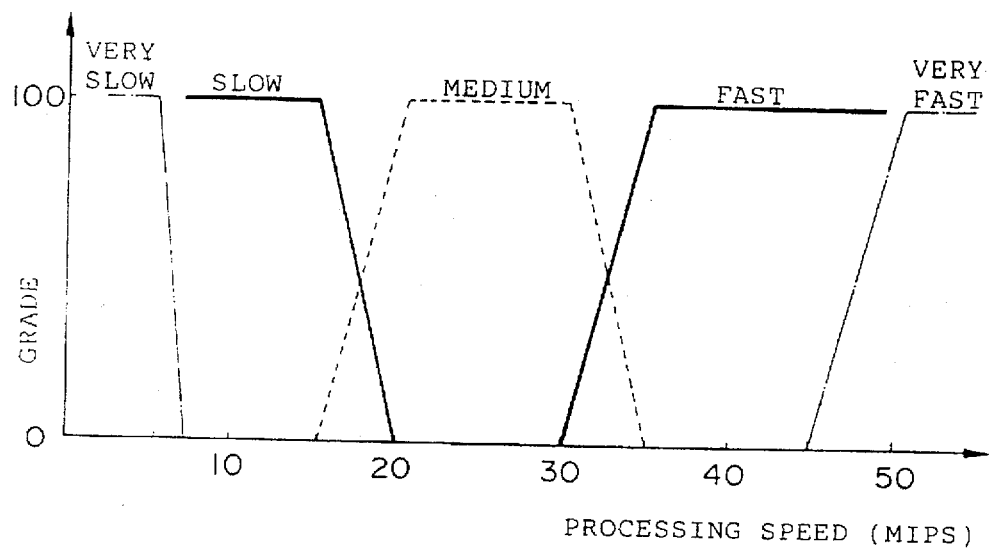
FIG. 8 is a graph showing an example of membership functions stored in the fuzzy data dictionary.

In the fuzzy data dictionary 22 shown in FIG. 6, a fuzzy label number of a fuzzy label name and membership function coordinates are stored beforehand for each and every fuzzy label. The fuzzy labels have been described above. The membership function coordinates are coordinate data which specifies the membership function of the fuzzy label. In this embodiment, membership functions are trapezoidal in shape, as shown in FIG. 8, for the sake of simplicity. The membership function coordinates of the fuzzy label name "very fast" are 45, 50. With reference to FIG. 8, the membership function of "very fast" possesses a grade of value 0 over a range of processing speeds of 0~45 MIPS, rises linearly to the upper right at the position of 45 MIPS, attains a grade 100 at 50 MIPS and is maintained at the grade 100 at processing speeds above 50 MIPS. In general, the grade of a membership function is decided to be within a range of 0~1. In this embodiment, however, it is assumed that grade has a value in a range of 0~100 (the same is true with regard to degree of membership as well). Further, the membership function coordinates of "slow" are 15, 20. This membership function has a grade of 100 in a range of 0~15 MIPS, varies linearly from grade 100 to 0 in a range of 15~20 MIPS and has a grade of 0 in the region above 20 MIPS. Furthermore, the membership function coordinates of the fuzzy label name "medium" are 15, 20, 30, 35. This membership function has a grade of 0 in the range of 0~15 MPS, varies linearly from grade 0 to 100 in the range of 15~20 MIPS, has a grade of 100 in the range of 20~30 MPS, varies linearly from grade 100 to 0 in the range of 30~35 MIPS and has a grade of 0 in the region above 35 MIPS. Membership function coordinates are decided in the same manner also with regard to "on the order of that of Machine A" as regards processing speed, and such as the fuzzy label "very high", "high" and "medium" relating to the price of the main body. Membership functions are expressed based upon these membership function coordinates. In the processing of step 52, it will suffice to read membership function coordinates of a fuzzy label name representing retrieval conditions out of the fuzzy data dictionary 22 and transfer these coordinates to the buffer.

Next, with regard to an attribute information, which is related to a given retrieval condition, among the attribute information that have been stored in the data base 21, degree of membership with respect to the retrieval condition (the membership function representing the retrieval condition) is calculated (step 53). The manner in which degree of membership is calculated differs depending upon whether the attribute information is a crisp number, a fuzzy number or a fuzzy label.

Figure 10:
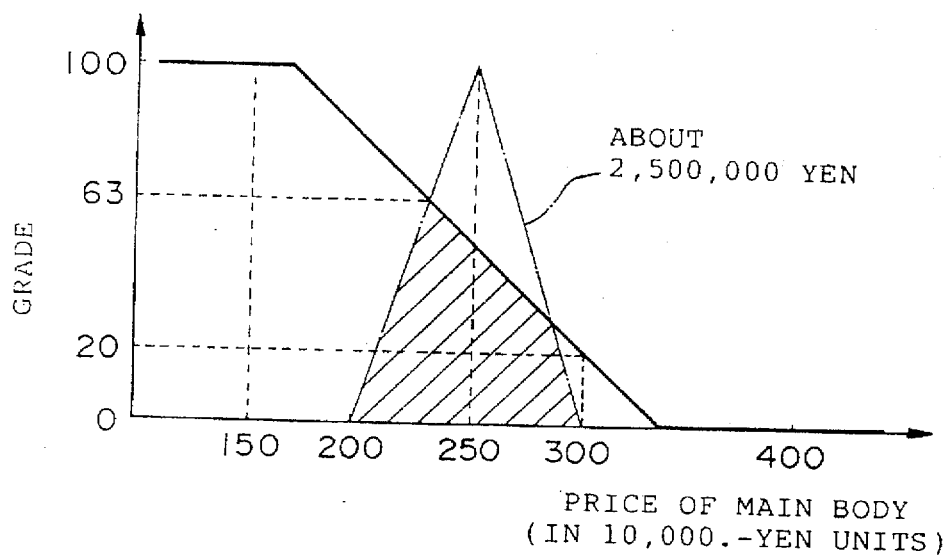
FIGS. 10 and 11 are graphs each showing the manner in which degree of membership is determined.

In a case where the attribute information is a crisp number, degree of membership is obtained by finding the membership function value (grade) with respect to the attribute information, in which the attribute information serves as a variable. A membership function to the effect that the price of the main body is "low" is illustrated in FIG. 10. In accordance with the data base 21, the price of the main body of machine name VV is a crisp number of 1,500,000 yen. In the membership function to the effect that the price of the main body is "low", the grade corresponding to 1,500,000 is 100. Accordingly, the degree of membership is obtained as 100. Similarly, the price of the main body of machine name XX is a crisp number of 3,000,000 yen, and the degree of membership is 20.

In a case where the attribute information is a fuzzy number, first a membership function representing the fuzzy number is created using the fuzzy number ratio in the fuzzy data dictionary 22, then the degree of membership is found by a MIN-MAX operation between the membership function of the fuzzy number and the membership function representing the retrieval condition.

In principle, a membership function representing a fuzzy number is expressed by a triangle. The position (grade=100) of the apex of the triangle is represented by a value (this will be referred to as a representative value $R_o$) obtained by deleting "about" from the fuzzy value, and the positions (referred to as $R_n$, $R_p$) of the two end points (both points of the coordinates) (grade=0) are calculated from the following equations:

$$R_n = R_o \times (1 - \text{fuzzy number ratio} \div 100) \qquad \text{Eq. (1)}$$

$$R_p = R_o \times (1 + \text{fuzzy number ratio} \div 100) \qquad \text{Eq. (2)}$$

For example, the price of the main body of machine name WW in the data base 21 is "about 2,500,000 yen". Further, when the fuzzy data dictionary 22 is referred to, the fuzzy number ratio of the price of the main body is 20. Accordingly, in this case, we have $$R_o = 2,500,000 \text{ yen} \qquad \text{Eq. (3)}$$

$$R_n = 2,500,000 \times (1 - 20 \div 100) = 2,000,000 \text{ yen} \qquad \text{Eq. (4)}$$

$$R_p = 2,500,000 \times (1 + 20 \div 100) = 3,000,000 \text{ yen} \qquad \text{Eq. (5)}$$

Figure 9:
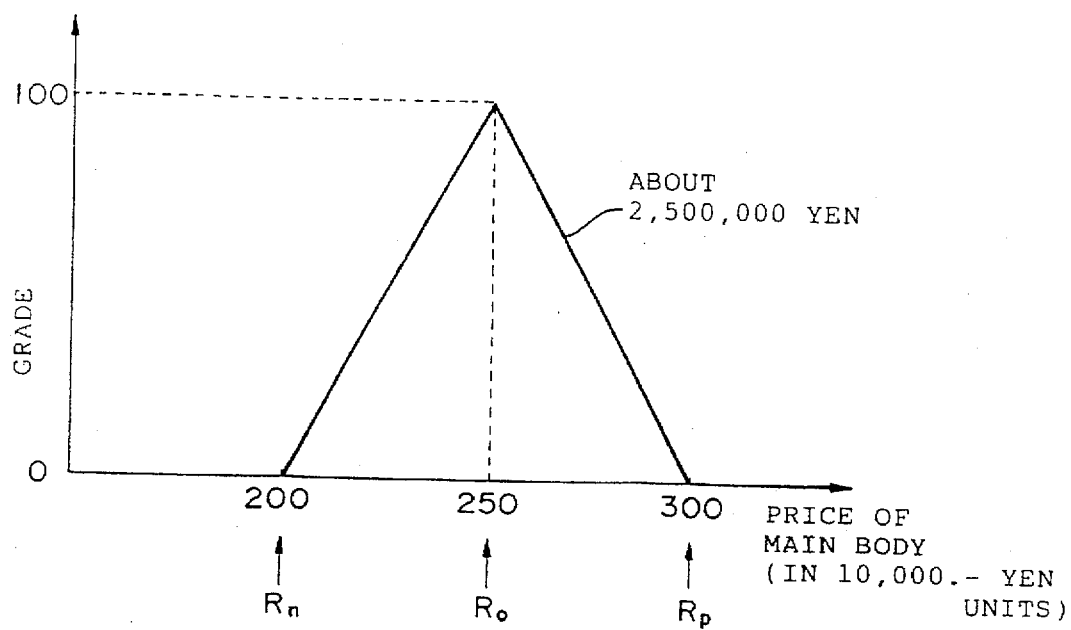
FIG. 9 is a graph showing the manner in which a membership function is created based upon a fuzzy number ratio stored in the fuzzy data dictionary.

This membership function is illustrated in FIG. 9.

Next, as illustrated in FIG. 10, a degree of membership of 63 is obtained by a MIN-MAX operation (the smaller of the points of intersection between two membership functions is selected) between the membership function of the fuzzy number "about 2,500,000 yen" and the retrieval condition "price of main body is low". In FIG. 10, the results of the MIN operation between two membership functions is represented by the polygonal line enclosing the hatched area. The maximum value (MAX) of these results is selected.

The membership function representing the processing speed "about 7 MIPS" of the same machine type WW is represented by the next three points $R_o$, $R_n$, $R_p$. The fuzzy number ratio of the processing speed is 10.

$$R_o = 7 \text{ MIPS} \qquad \text{Eq. (6)}$$

$$R_n = 7 \times (1 - 10 \div 100) = 6.3 \text{ MIPS} \qquad \text{Eq. (7)}$$

$$R_p = 7 \times (1 + 10 \div 100) = 7.7 \text{ MIPS} \qquad \text{Eq. (8)}$$

In a case where the attribute information is a fuzzy label, reference is made to the fuzzy data dictionary 22 to find the degree of membership by a MIN-MAX operation between a membership function represented by the membership function coordinates corresponding to the name of this fuzzy label and the membership function representing the retrieval condition (this membership function also is obtained by referring to the fuzzy data dictionary 22 as set forth above).

Figure 11:
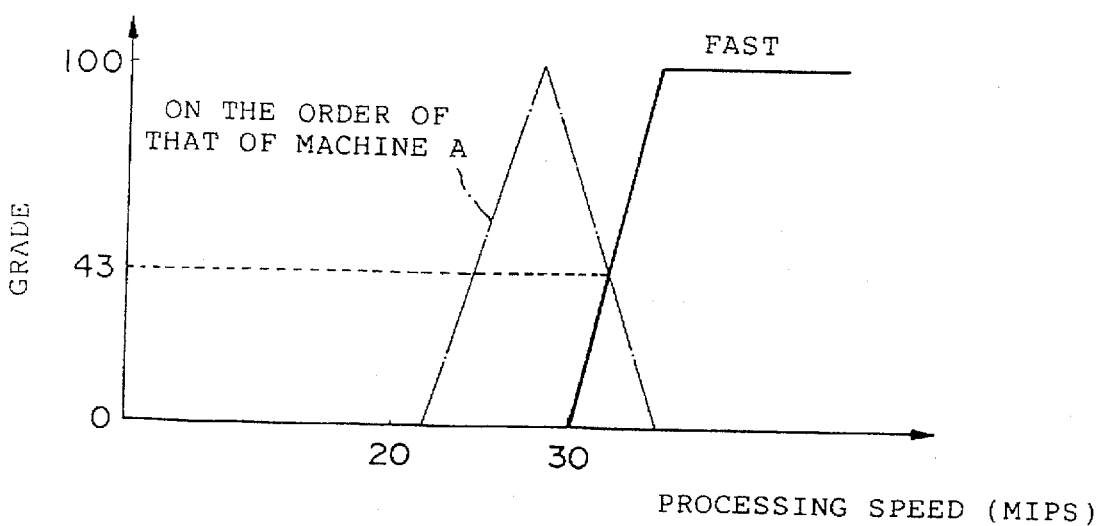

For example, with reference to FIG. 11, and in the case of machine type YY, the membership function of the processing speed "on the order of that of Machine A" is obtained from the fuzzy data dictionary 22. The membership function representing the retrieval condition "processing speed is fast" is obtained from the fuzzy data dictionary 22 in the same manner. The degree of membership is obtained as being 43 based upon the result of the MAX-MIN operation between these two membership functions.

Thus, the degrees of membership of all attribute information regarding given retrieval conditions are found. FIG. 12 illustrates an example of the degrees of membership obtained. This table of degrees of membership is outputted from the output unit (printer 15 or display unit 16) (step 54). The user selects the optimum type of machine from the outputted table of degrees of membership.

Thus, by attaching status information to data registered in the data base, not only crisp values but also fuzzy numbers and fuzzy linguistic expressions can be stored in the data base together with the crisp numbers and can be used as a data base for fuzzy retrieval processing.

A modification will now be described.

When a data base is created in a fuzzy retrieval apparatus according to this modification, the degree of credibility of attribute information is entered in addition to the item and attribute information mentioned earlier and this is registered in the data base. An example of data to which degree of credibility has been added is shown in FIG. 13.

Degree of credibility is the result of representing the extent to which data is credible by a numerical value of 0~100. Conventionally, only data having a high precision is registered in order to improve the reliability of the data base. However, there are also cases in which newness of information is required even if the precision of the information is sacrificed to some extent. In order to deal with such cases, degree of credibility is attached to attribute data and then the attribute data is registered in the data base according to this modification. As a result, it is possible to register new information in the data base at an early stage. For example, the "degree of credibility" of a processing speed which is "very fast" of "machine type ZZ" is set to 30.

Figure 14:
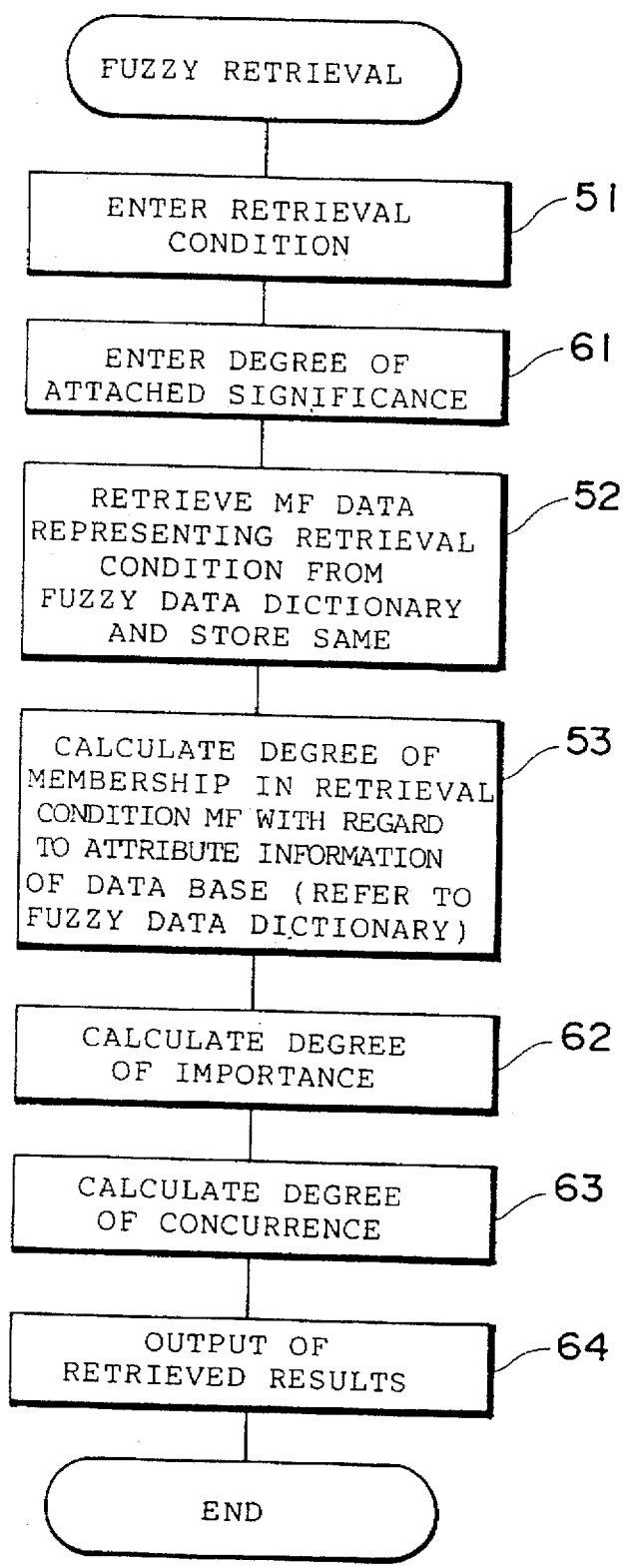
FIG. 14 is a flowchart illustrating fuzzy retrieval processing of the modification.

FIG. 14 illustrates a processing procedure for performing fuzzy retrieval using a data base to which such degree of credibility has been added. Processing steps identical with those shown in FIG. 7 are assigned identical numbers.

The degree of significance that the user attaches to a retrieval condition is entered for each retrieval condition in addition to the retrieval condition described above (step 61).

The degree of attached significance refers to the extent to which the individual performing retrieval attaches significance to a retrieval condition and is represented by a numerical value of 0~100. This makes it possible to perform practical application of information that has been "modulated". In other words, retrieval conditions are weighted. In this example, the "degree of attached significance" of the retrieval condition "price of main body is low" is 80, and the "degree of attached significance" of "processing speed is fast" is 90.

By using the degree of credibility registered in the data base 21 and the entered degree of attached significance, degree of importance is calculated in accordance with the following equation for every item (name of machine type) that is the object of retrieval and attribute information (price of main body and processing speed) (step 62):

$$\text{degree of importance} = (\text{degree of credibility} \div 100) \times (\text{degree of attached significance} \div 100) \times 100 \quad \text{Eq. (9)}$$

The results of calculating degree of importance are shown in FIG. 15. Either calculation of degree of membership (steps 52, 53) or calculation of degree of importance (step 62) may be performed first.

By using the degree of importance and degree of membership thus obtained, degree of concurrence is calculated using the following equation for each and every item (machine type) (step 63):

$$\text{degree of concurrence} = (\Sigma \text{ degree of membership} \times \text{degree of importance}) / (\Sigma \text{ degree of importance}) \quad \text{Eq. (10)}$$

The summation $\Sigma$ is performed with regard to all attributes of the subject of retrieval for each item (in this example, the attributes are price of the main body and processing speed).

For example, the degree of concurrence with regard to the machine type ZZ is obtained as follows:

$$\text{degree of concurrence of machine type ZZ} = (39 \times 65 + 100 \times 27)/(65 + 27)$$
$$= 56.9$$

Calculated degrees of concurrence with regard to all machine types are illustrated in FIG. 16. Finally, the degrees of concurrence obtained are outputted (step 64). Degrees of membership and degrees of importance may also be outputted, as illustrated in FIG. 16.

Second Embodiment

The second embodiment is so adapted that an explanatory statement relating to a result of retrieval is outputted to the user of the fuzzy retrieval apparatus so as to assist the user in decision making.

The basic configuration of the fuzzy retrieval apparatus is the same as shown in FIG. 1. A terminal, system and other devices for executing processing conforming to the result of retrieval are connected to the fuzzy retrieval apparatus.

Figure 17:
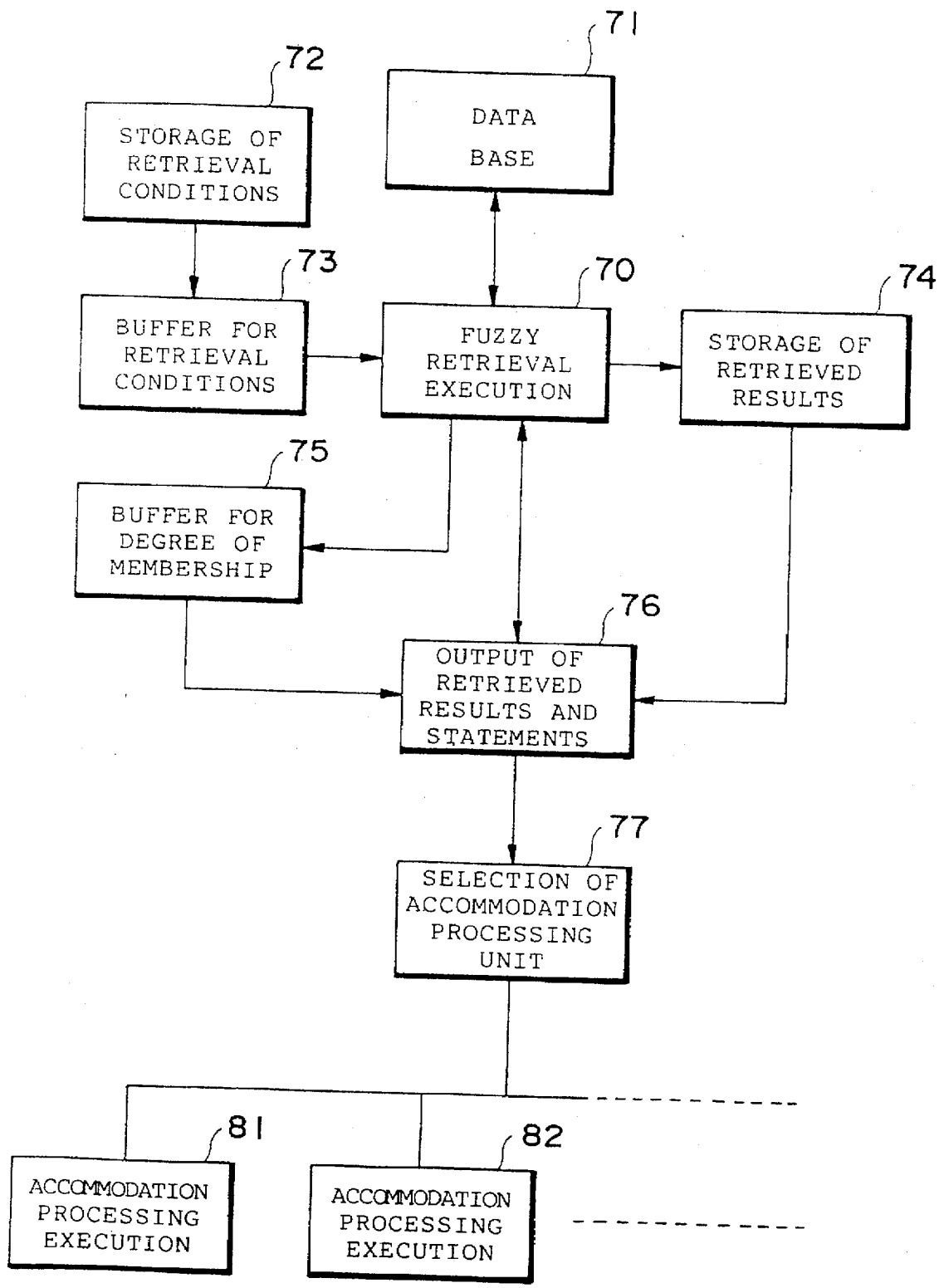
FIG. 17 is a functional block diagram illustrating a principal portion of the fuzzy retrieval apparatus according to the second embodiment.

FIG. 17 illustrates the functional arrangement of the fuzzy retrieval apparatus as well as an accommodation-processing execution apparatus connected to the fuzzy retrieval apparatus.

Fuzzy retrieval execution 70, part of a retrieved result and explanatory-statement output 76 and selection 77 of an apparatus for accommodation-processing execution are implemented by the CPU 10. Base data for retrieval processing has been stored in a data base 71 in advance. An example of the data base 71 is shown in FIG. 19. Data representing explanatory statements also is stored in the data base 71 in correspondence with retrieval conditions in order to output (display or print) explanatory statements, described later. A large number of retrieval conditions that have been set in advance are stored in the a retrieval-condition storage unit 72. FIG. 20 illustrates an example of the retrieval conditions that have been stored in the storage unit 72. The data base 71 and storage unit 72 are realized by the hard disk unit 13. Retrieval conditions selected or extracted from those stored in the retrieval-condition storage unit 72 are accumulated in a retrieval-condition buffer 73 in connection with execution of retrieval processing. An example of retrieval conditions stored temporarily in the buffer 73 is shown in FIG. 21. Results of retrieval obtained by the means 70 for executing retrieval processing and degree of membership obtained when results of retrieval are derived are stored in a memory device 74 and a buffer 75, respectively. The buffers 73, 75 and memory device 74 are realized by the RAM 12. Output 76 of the retrieved results and explanatory-statement is executed by the printer 15 or display unit 16. Units 81, 82 for execution of accommodation processing are a direct mailing system and a system for creating a written request for forwarding of a catalog, by way of example. In general, these are systems separate from the fuzzy retrieval apparatus and are connected to the fuzzy retrieval apparatus on-line. An arrangement may be adopted in which the functions of the units 81, 82 are realized by the fuzzy retrieval apparatus.

Figure 18:
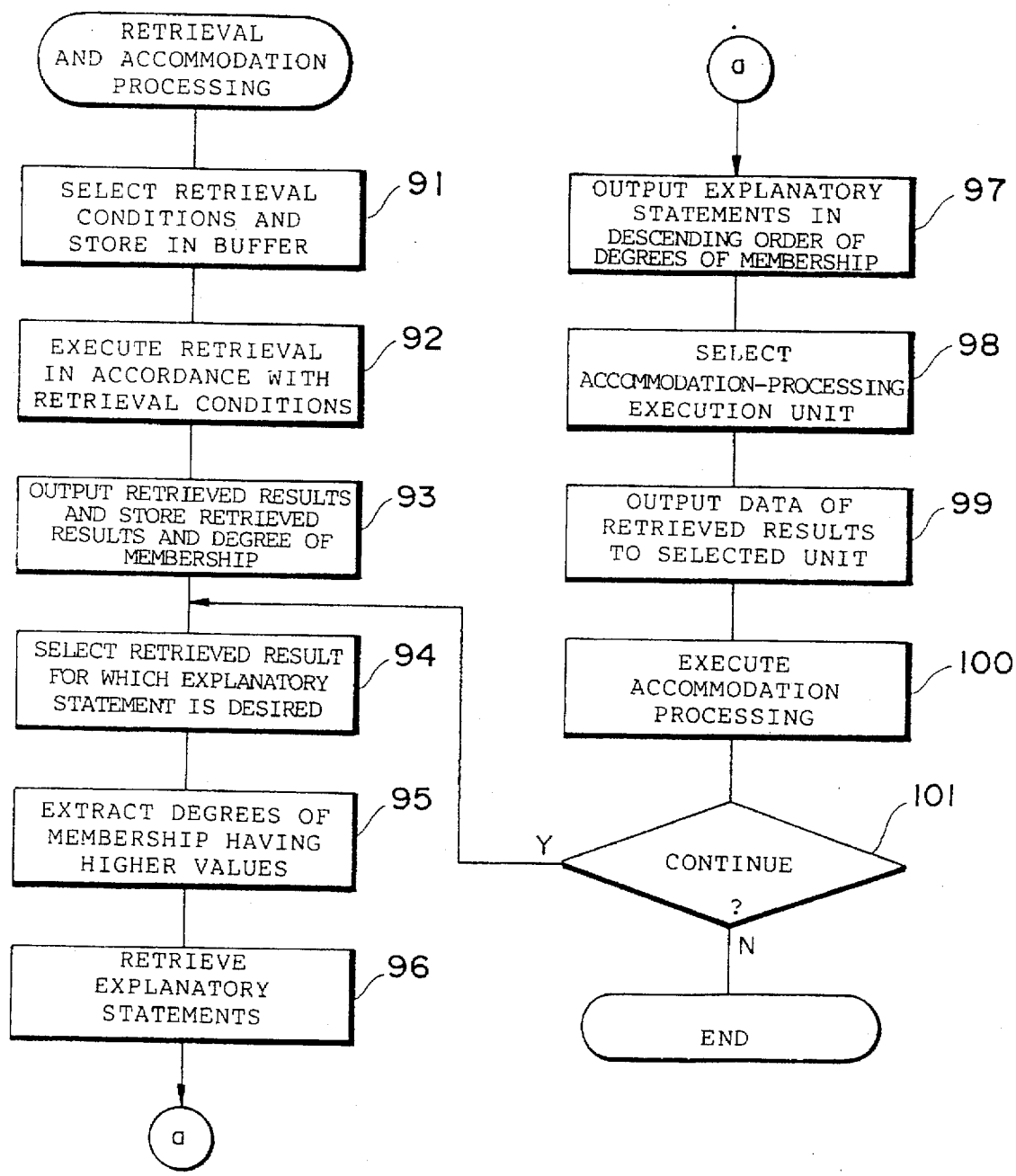
FIG. 18 is a flowchart illustrating retrieval and accommodation processing.

Fuzzy retrieval of a customer data base by an automobile dealer will be described as one example. FIG. 18 illustrates the flow of overall processing in the fuzzy retrieval apparatus. This processing is executed mainly by the CPU 10. It will be assumed that the customer data base shown in FIG. 19 has been stored as the data base 71.

When subject matter (or a retrieval condition) that the user desires to be retrieved is entered, or in accordance with a program that has been determined in advance, a prescribed retrieval condition is selected from the large number of retrieval conditions that have been stored in the retrieval-condition storage unit 72 and the selected retrieval condition is transferred to the retrieval-condition buffer 73 (step 91). It will be assumed that three retrieval conditions R2, R3, R7 shown in FIG. 21 are selected from among the retrieval conditions shown in FIG. 20 and stored in the storage unit 72, and these selected retrieval conditions are stored in the buffer 73. The three retrieval conditions are as follows:

retrieval condition R2: next scheduled automobile inspection is near retrieval condition R3: annual income is high retrieval condition R7: age of dependent is about 18

Fuzzy retrieval processing is executed in accordance with these retrieval conditions (step 92). Fuzzy retrieval processing is the same as in the first embodiment described above. The retrieval conditions R2, R3, R7 are all fuzzy concepts and membership functions have already been stored in the fuzzy data dictionary (not shown in FIG. 17) with regard to respective ones of these retrieval conditions. With regard to retrieval condition R2, degrees of membership of data relating to times for the next scheduled automobile inspection are each obtained with respect to the membership function representing the retrieval condition R2. With regard to the retrieval condition R3, degrees of membership of income data in data base 71 are each obtained with respect to the membership function representing the retrieval condition R3. With regard to the retrieval condition R7, degrees of membership of age data in data base 71 are each obtained with respect to the membership function representing the retrieval condition R7. On the basis of these degrees of membership, data items having fairly good conformity to all or some of the retrieval conditions R2, R3, R7 are extracted, whereby results of retrieval are obtained. For example, it will assumed that data items $U_1$, $U_2$ have fairly good conformity to the retrieval conditions R2, R3, R7, as illustrated in FIG. 22.

The results of retrieval shown in FIG. 22 are outputted through the printer 15 or display unit 16. Further, the results of retrieval are stored in the memory device 74 and the degrees of membership used in retrieval processing are stored in the buffer 75 (step 93).

When the results of retrieval (FIG. 22) are outputted, the user selectively enters a desired explanatory statement from among these results of retrieval or the CPU 10 selects whichever explanatory statement is necessary in accordance with a program (step 94). As a result, the degrees of membership relating to the selected data items are fetched from the buffer 75. It will be assumed that $U_1$, $U_2$ both have been selected as requiring explanatory statements. Degrees of membership relating to the data items $U_1$, $U_2$ requiring explanatory statements are illustrated in FIG. 23.

Among these units of degree-of-membership data, the degrees of membership having higher values, e.g., values above a threshold value of 0.6, are extracted (step 95). The degrees of membership extracted are encircled in FIG. 23.

Since data representing appropriate explanatory statements have been stored in the data base 71 in correspondence with the retrieval conditions, explanatory statements of retrieval conditions associated with the extracted degrees of membership are read out of the data base 71 (step 76) and the explanatory statements are outputted, for each and every retrieval condition, in descending order of retrieval conditions in terms of degree of membership in relation to the same data item (step 97). An example of the explanatory statements outputted is shown in FIG. 24.

Based upon the explanatory statements, the user is capable of ascertaining which customers are quite likely to purchase an automobile for a particular reason. This makes it possible for the user to decide a sales policy. Thus, the explanatory statements give assistance in terms of deciding what actions the user should take in accordance with the results of retrieval.

When the user has decided the action or policy, the user takes the required action. The action to be taken by the user is assisted by the units 81, 82 for executing accommodation processing. Whichever of these execution units is appropriate is selected for each and every data item or retrieval condition (step 98). For example, the direct mailing system (e.g., unit 81) is selected with regard to No. Ui(Mr. A), and the system for creating a written request for mailing of a catalog (e.g., unit 82) is selected with regard No. $U_2$ (Mr. B).

The data necessary for execution processing is transferred to the selected execution unit from the data base 71 or the memory devices 74, 75 (step 99). In response, the execution unit performs accommodation processing automatically (step 100). For example, with regard to data item $U_1$ (Mr. A), the direct mailing system creates direct mail for giving notification of the fact that the automobile must soon be inspected. With regard to data item $U_2$ (Mr. B), the system for creating a written request for mailing of a catalog creates a written request directed to the person in charge of mailing catalogs or to a mailing company so that a catalog of automobiles of models close to that presently owned will be mailed.

In a case where output of a different or succeeding explanatory statement is requested, the program returns to step 94 (step 101).

Thus, by defining beforehand processing to be executed next with regard to results of retrieval, the next processing operation can be performed automatically. This reduces the labor required of the user. Further, in an application so adapted that the fuzzy retrieval apparatus is equipped with a POS data base, an order for an appropriate commodity can be issued before the inventory of the commodity runs out. This makes it possible to prevent a decline in proceeds.

Since explanatory statements regarding results of retrieval are thus outputted, decision making of the user in accordance with the results of retrieval is capable of being assisted.

In this embodiment, explanatory statements are outputted solely with regard to higher degrees of membership. However, it goes without saying that these can be outputted irrespective of the size of the value of degree of membership. Furthermore, though the retrieval conditions are stored in the hard disk unit 13 in advance according to this embodiment, it goes without saying that the retrieval conditions may be entered from the keyboard 14.

Third Embodiment

The third embodiment relates to an apparatus for creating membership functions.

Figure 25:
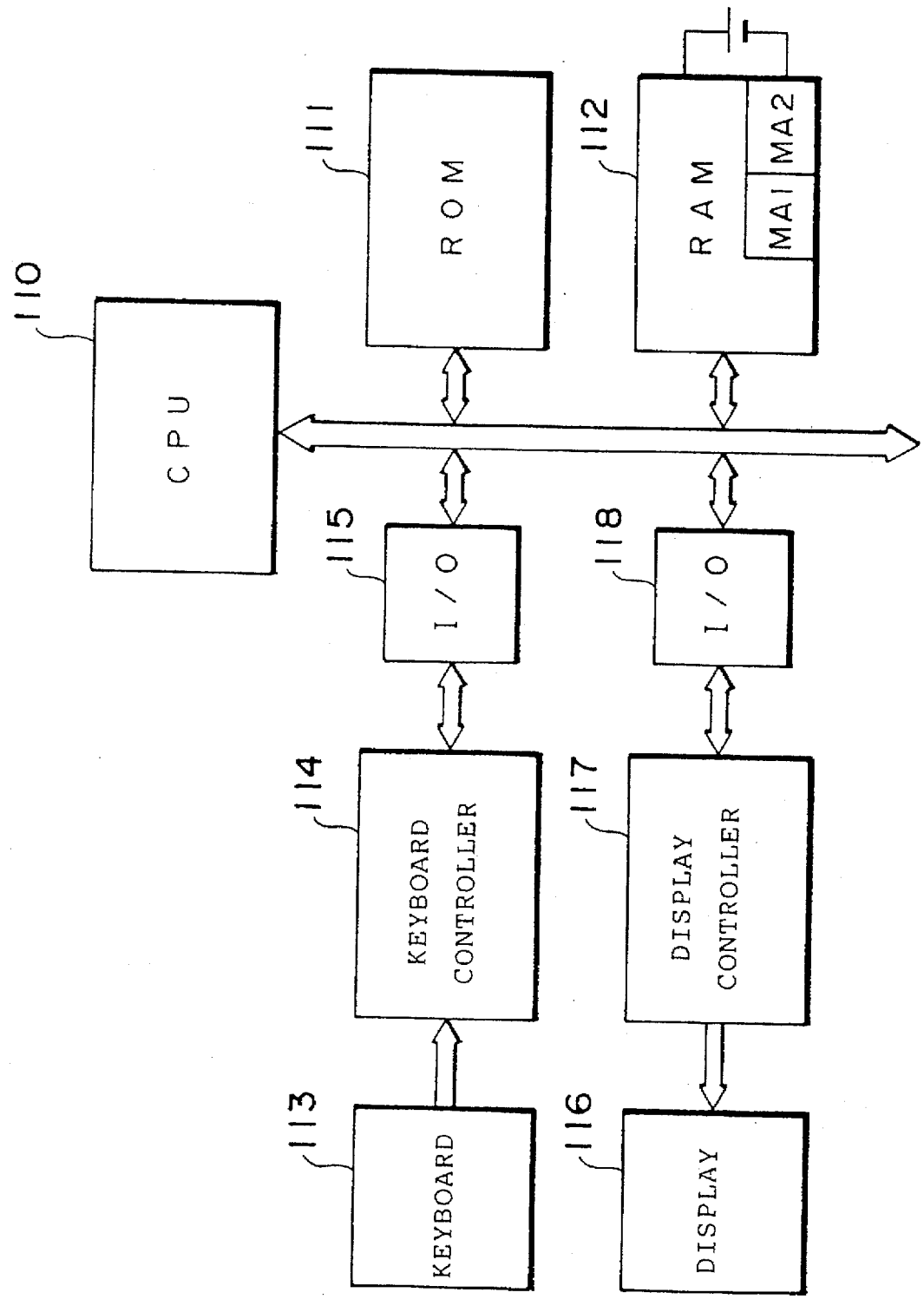
FIG. 25 is a block diagram illustrating the electrical configuration of an apparatus for creating membership functions according to a third embodiment of the present invention.

FIG. 25 is a block diagram illustrating the configuration of an apparatus for creating membership functions. The apparatus can be constituted by a small-size computer such as a personal computer. A keyboard controller 114 and a display controller 117 are connected via interface circuits 115, 118, respectively, to a CPU 110 equipped with a ROM 111 and a RAM 112. A keyboard controller 114 provides the CPU 110 with input data from a keyboard 113. A display controller 117 drives and controls a display unit 116 in accordance with display data outputted by the CPU 110. In accordance with a program that has been written in the ROM 111 in advance, the CPU 110 executes processing for creating a membership function.

The data inputted to and outputted from this apparatus is stored temporarily in a prescribed memory area of the RAM 112. Data representing an existing membership function is stored in a memory area MA1 of the RAM 112, and data that designates an arithmetic expression set in advance is stored in a memory area MA2 of RAM 112. The RAM 112 is backed up by a battery and preserves the stored contents of the memory areas MA1, MA2 even after the power supplied to the apparatus for creating membership functions is cut off. The memory areas MA1, MA2 can also be provided in another rewritable non-volatile memory such as an EEPROM.

Figure 26:
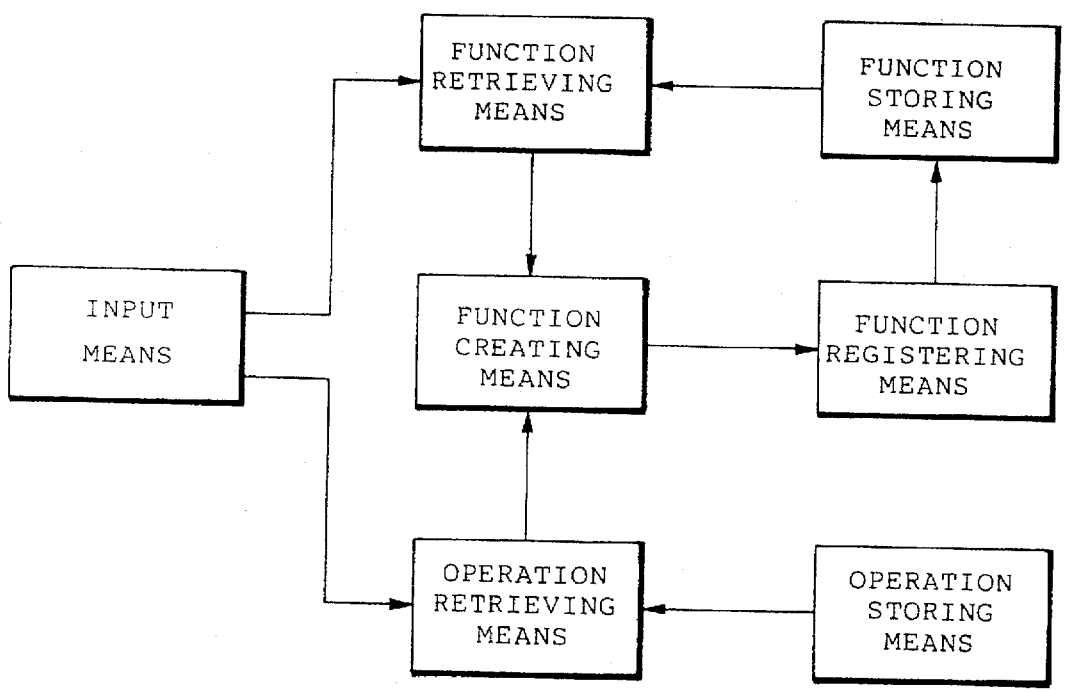
FIG. 26 is a functional block diagram of the apparatus for creating membership functions.

FIG. 26 is a block diagram in which the above-mentioned apparatus for creating membership functions is expressed in terms of its functions. Input means is realized by the keyboard 113. The memory areas MA1, MA2 of the RAM 112 correspond to means for storing functions and means for storing operations, respectively. Other functions, namely means for retrieving functions, means for creating functions, means for registering functions and means for retrieving operations are implemented by the CPU 110, which executes processing in accordance with a procedure described below in detail.

Figure 27:
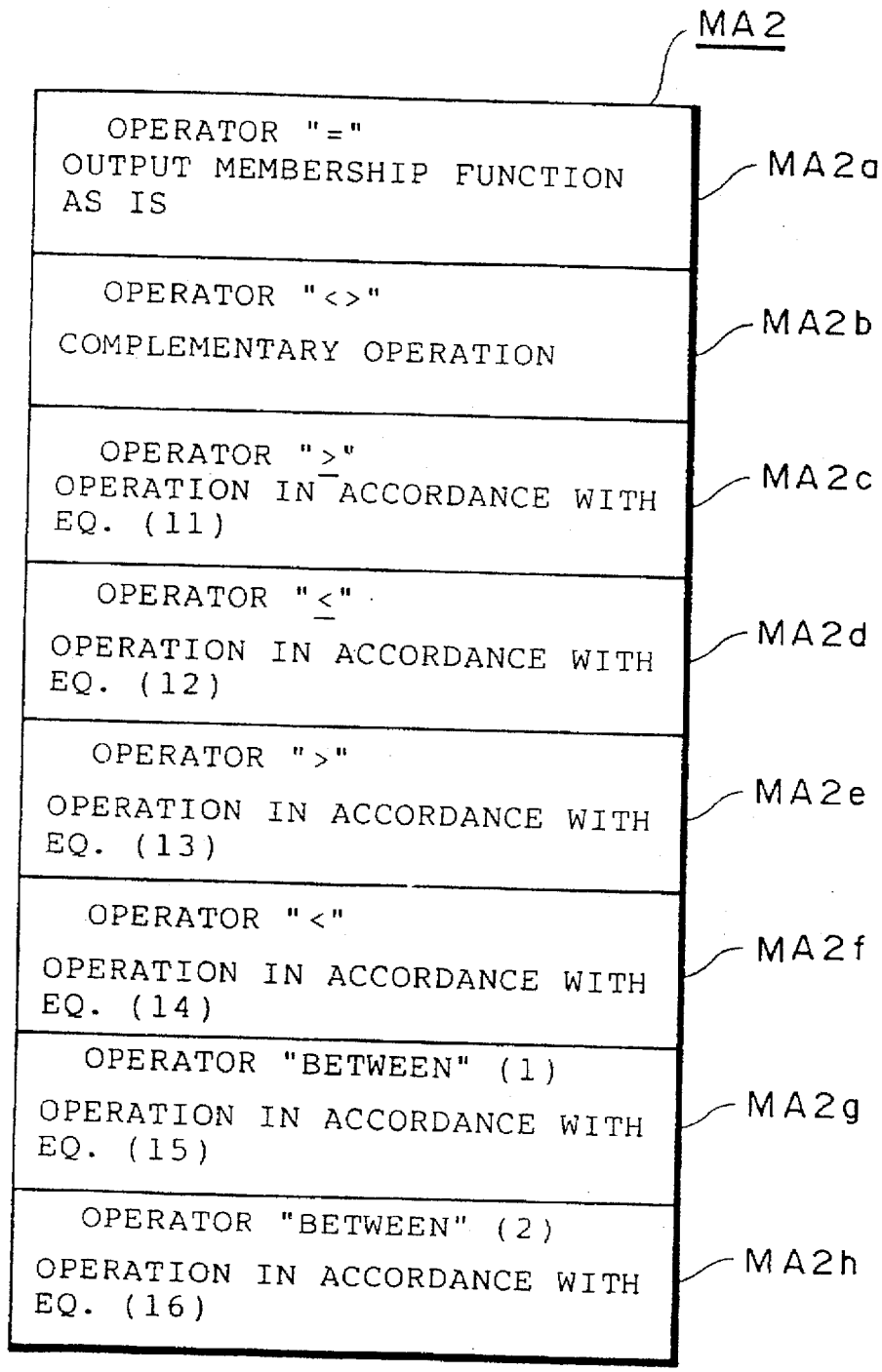
FIG. 27 shows memory areas in which pointers of processing corresponding to operators have been stored.

FIG. 27 illustrates the constitution of the memory area MA2 of RAM 112. The memory area MA2 is composed of areas MA2a~MA2h. The area MA2a stores a program for executing an operation represented by an operator "=" corresponding to the expression "equal to" or a pointer indicating a storage location of this program in the ROM 111. In general, the program is stored in the ROM 111. It is possible to read out the program that executes the operator "=" by addressing the ROM 111 in accordance with the pointer (address) that has been stored in the memory area MA2a. Similarly, the pointer of a program that executes the operation represented by an operator "<>" corresponding to the expression "unequal to", the pointer of a program that executes the operation represented by an operator "≧" corresponding to the expression "equal to or greater than", the pointer of a program that executes the operation represented by an operator "≦" corresponding to the expression "equal to or less than", the pointer of a program that executes the operation represented by an operator ">" corresponding to the expression "greater than", the pointer of a program that executes the operation represented by an operator "<" corresponding to the expression "less than", and two pointers of a program that executes the operation represented by an operator "between" corresponding to a range expression are stored in areas MA2b~MA2h, respectively.

Figure 28A:
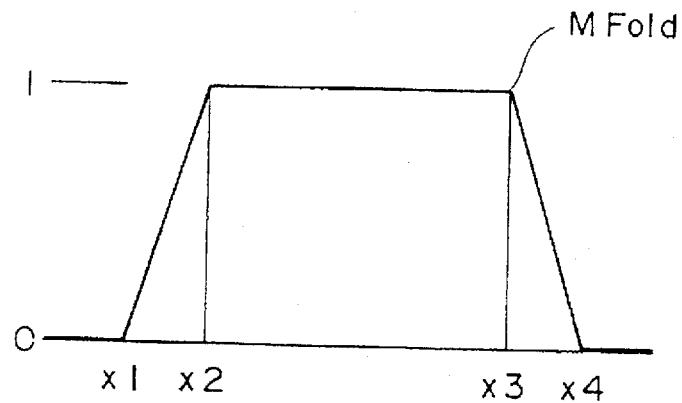
FIGS. 28 (A)~(G), FIGS. 29(A), (B), FIGS. 30(A), (B) and FIGS. 31(A), (B) are graphs showing the manner in which new membership functions are created by arithmetic operations on the basis of existing membership functions.

The details of the operations represented by these various operators will now be described. An existing membership function used in the creation of a function is represented by MFold, and a new membership function to be created is represented by MFnew. The horizontal axis of the membership function, namely the input value, is represented by x. The vertical axis is the grade and takes on a value of 0~1. An existing membership function MFold used in function creation has the shape shown in FIG. 28(A).

Figure 28B:
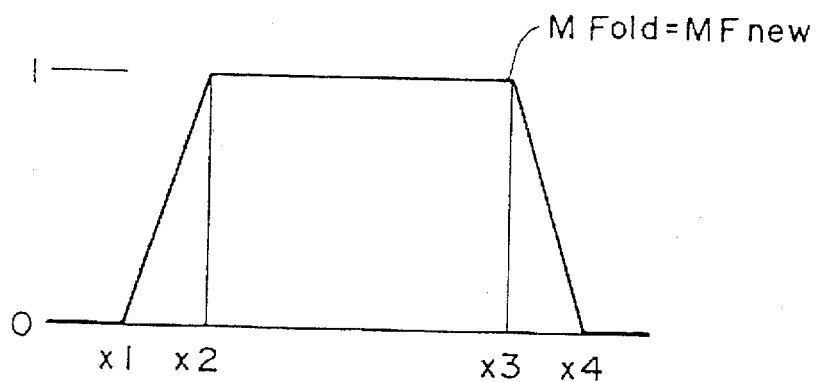

In the case of the operation in accordance with the operator "=", we have MFnew=MFold. As shown in FIG. 28(B), the existing membership function MFold is outputted as is.

Figure 28C:
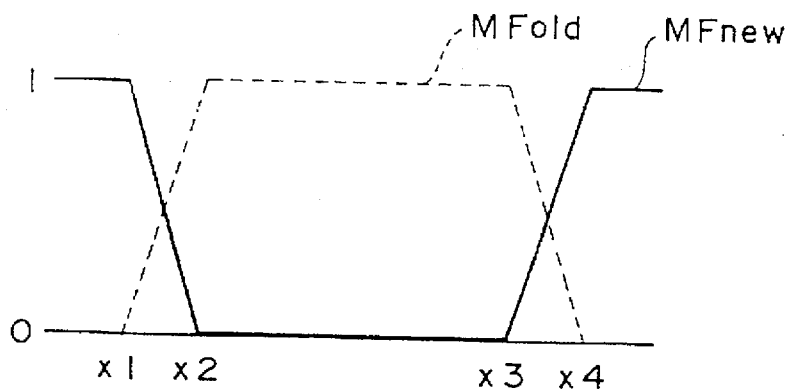

The operation of the operator "<>" is a complementary operation of MFold. The new membership function MFnew has the shape shown in FIG. 28(C).

Figure 28D:
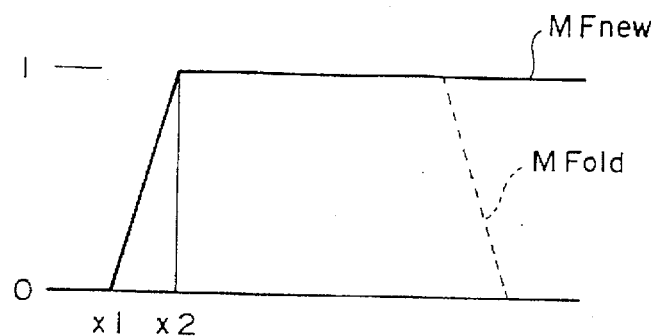

The operator "≧" signifies the operation shown below, and MFnew obtained by this operation has the shape shown in FIG. 28(D).

$$MFnew \begin{cases} 0 & (x<x1) \\ MFold & (x1 \leq x \leq x2) \\ 1 & (x>x2) \end{cases} \quad \text{Eq. (11)}$$

Figure 28E:
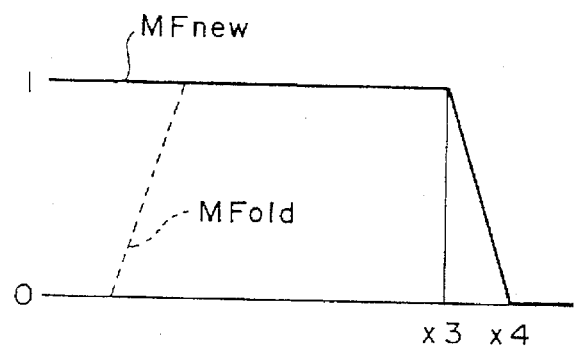

The operator "≦" signifies the operation shown below, and MFnew obtained by this operation has the shape shown in FIG. 28(E).

$$MFnew \begin{cases} 1 & (x<x3) \\ MFold & (x3 \leq x \leq x4) \\ 0 & (x>x4) \end{cases} \quad \text{Eq. (12)}$$

Figure 28F:
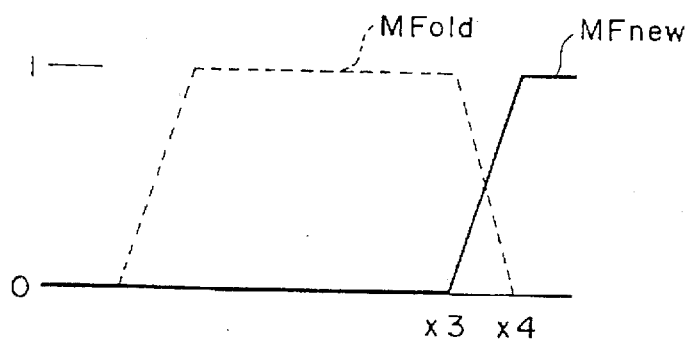

The operator ">" signifies the operation shown below, and MFnew obtained by this operation has the shape shown in FIG. 28(F).

$$MFnew \begin{cases} 0 & (x<x3) \\ 1-MFold & (x3 \leq x \leq x4) \\ 1 & (x>x4) \end{cases} \quad \text{Eq. (13)}$$

Figure 28G:
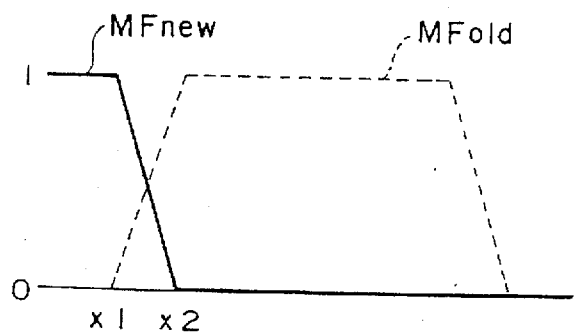

The operator "<" signifies the operation shown below, and MFnew obtained by this operation has the shape shown in FIG. 28(G).

$$MFnew \begin{cases} 1 & (x<x2) \\ 1-MFold & (x1 \leq x \leq x2) \\ 0 & (x>x1) \end{cases} \quad \text{Eq. (14)}$$

Figure 29A:
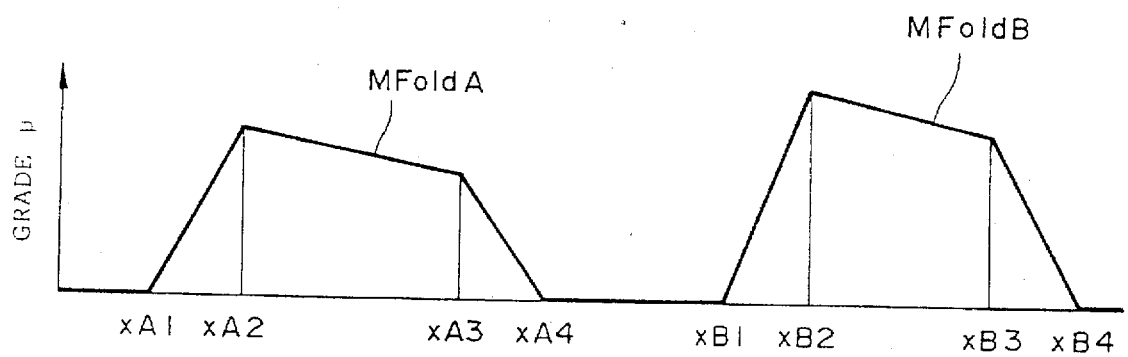
Figure 30A:
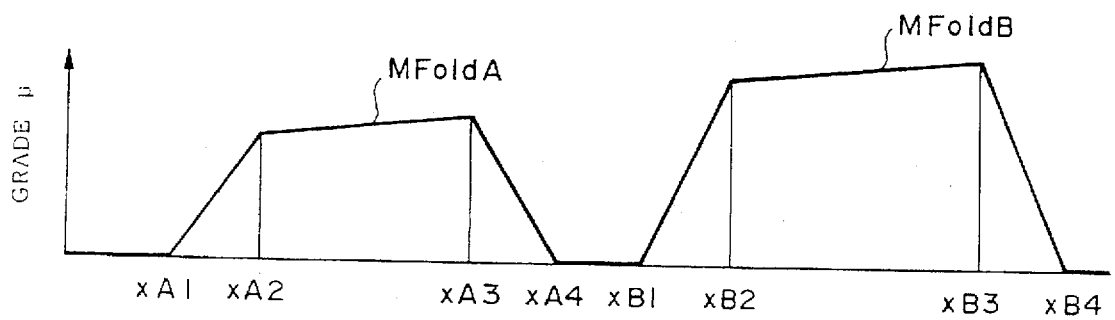
Figure 31A:
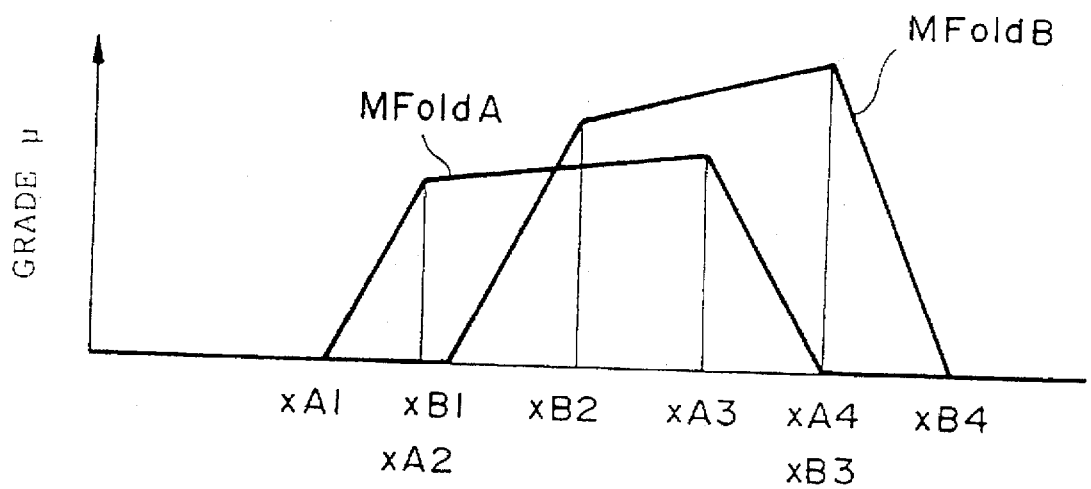

The operator "between" signifies one type of processing in a case where two existing membership functions MFold A and MFold B are separated from each other along the horizontal axis, as shown in FIGS. 29(A) and 30(A), and a different type of processing in a case where MFold A and MFold B overlap each other along the horizontal axis, as shown in FIG. 31(A).

The following operation is performed in a case where MFold A and MFold B are separated from each other along the horizontal axis, as shown in FIGS. 29(A) and 30(A):

$$MFnew = \qquad \text{Eq. (15)}$$

$$\begin{cases} 0 & (x<xA1) \\ MFold\,A & (xA1 \leq x \leq \\ \left(\mu A + \dfrac{\mu A(max) - \mu B(max)}{xA(max) - xB(max)}\right) \cdot x(MAX) & xA(\mu-max)) \\ MFoldA & (MAX)\,MFold\,B \\ & (xA(\mu-max) < x < \\ & xB(\mu-max)) \\ MFold\,B & (xB(\mu-max) \leq \\ & x \leq xB4) \\ 0 & (xB4 < x) \end{cases}$$

Figure 29B:
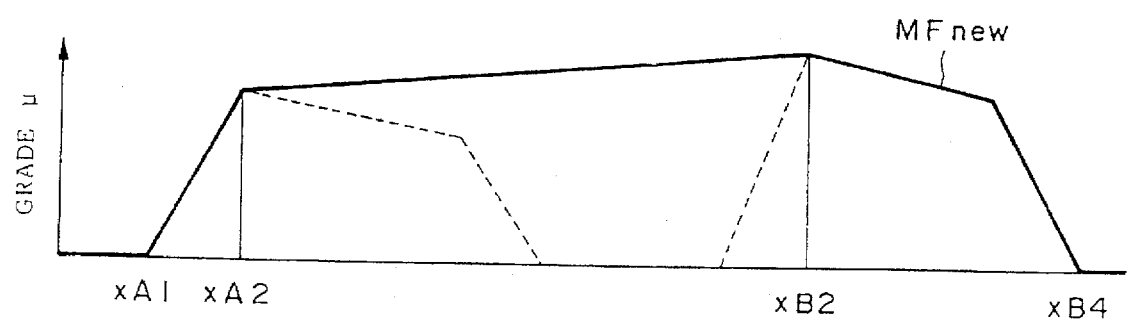
Figure 30B:
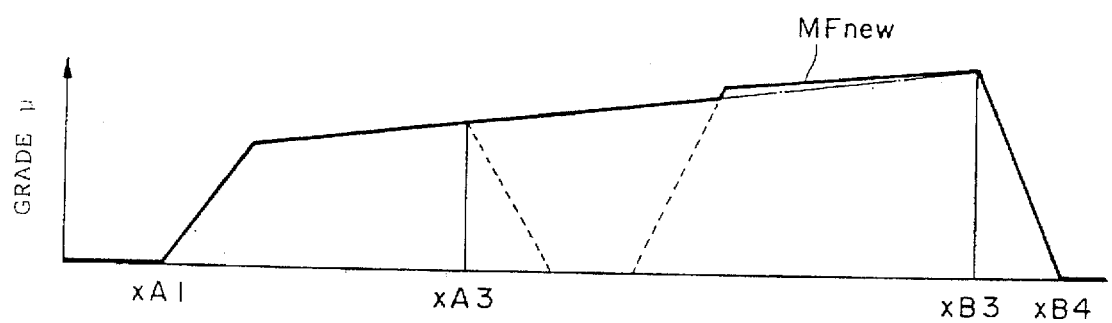

MFnew takes on the shape shown in FIG. 29(B) or FIG. 30 (B).

Here (MAX) is an operation for selecting the maximum value. Further, μA is the grade of MFold A, and μB is the grade of MFold B. μA(max) is the maximum value of the grade of MFold A, and μB(max) is the maximum value of the grade of the MFold B. Furthermore, xA(μ-max) is the value of x that corresponds to grade μA(max), and xB(μ-max) is the value of x that corresponds to grade μB (max).

An operation in accordance with the following equation is performed in a case where MFold A and MFold B overlap each other on the horizontal axis, as shown in FIG. 31 (A).

$$MFnew = MFold\ A\ (MAX)\ MFold\ B \qquad Eq.\ (16)$$

Figure 31B:
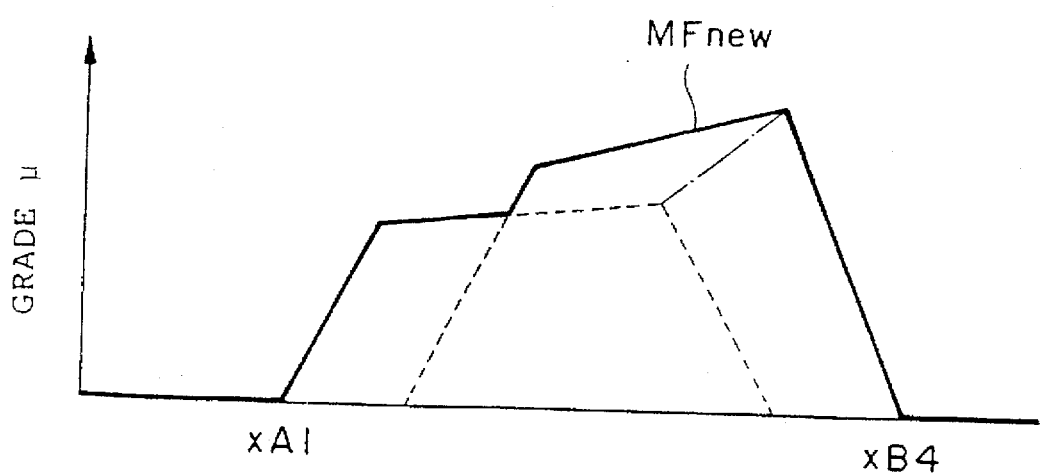

MFnew thus obtained is illustrated in FIG. 31(B).

Figure 32:
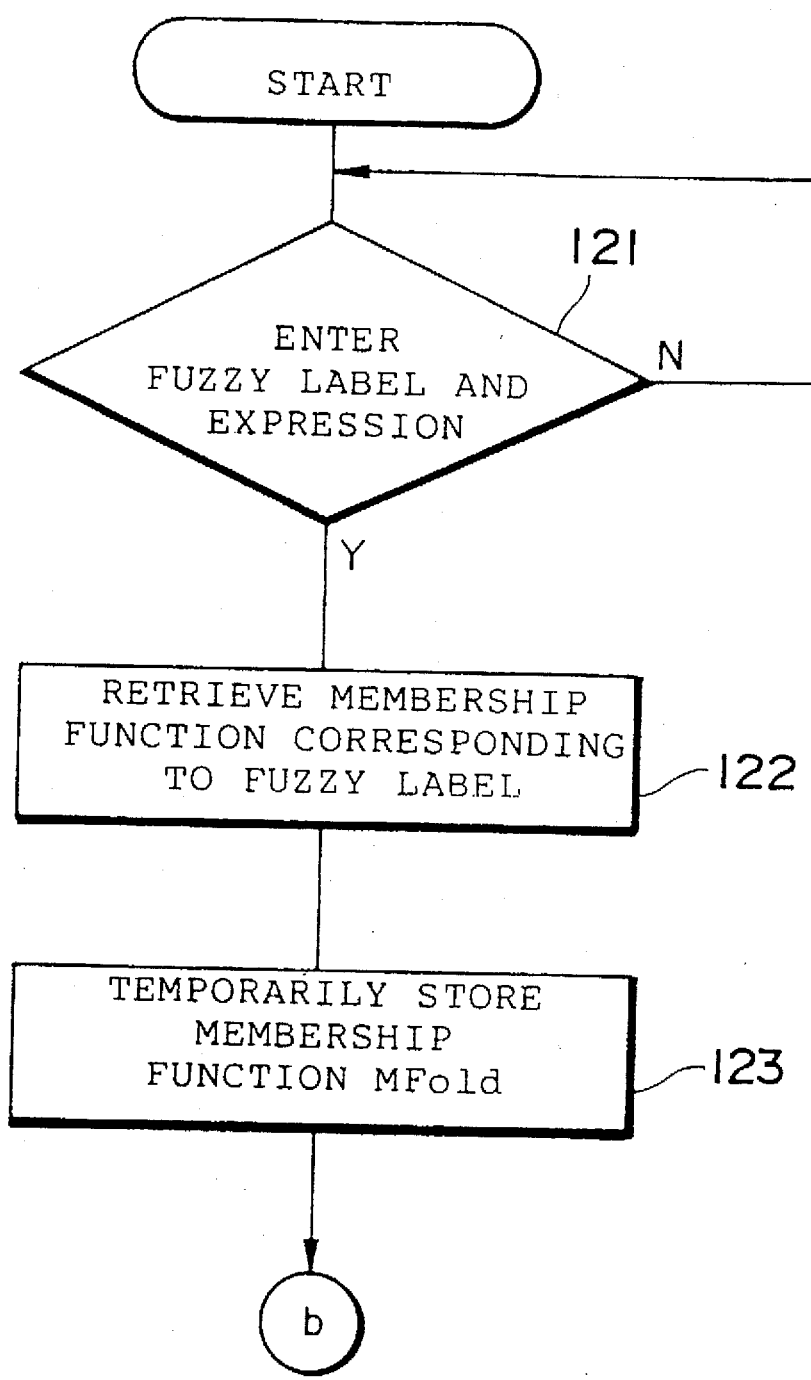
FIGS. 32 and 33 are flowcharts illustrating processing for creating a membership function.
Figure 33:
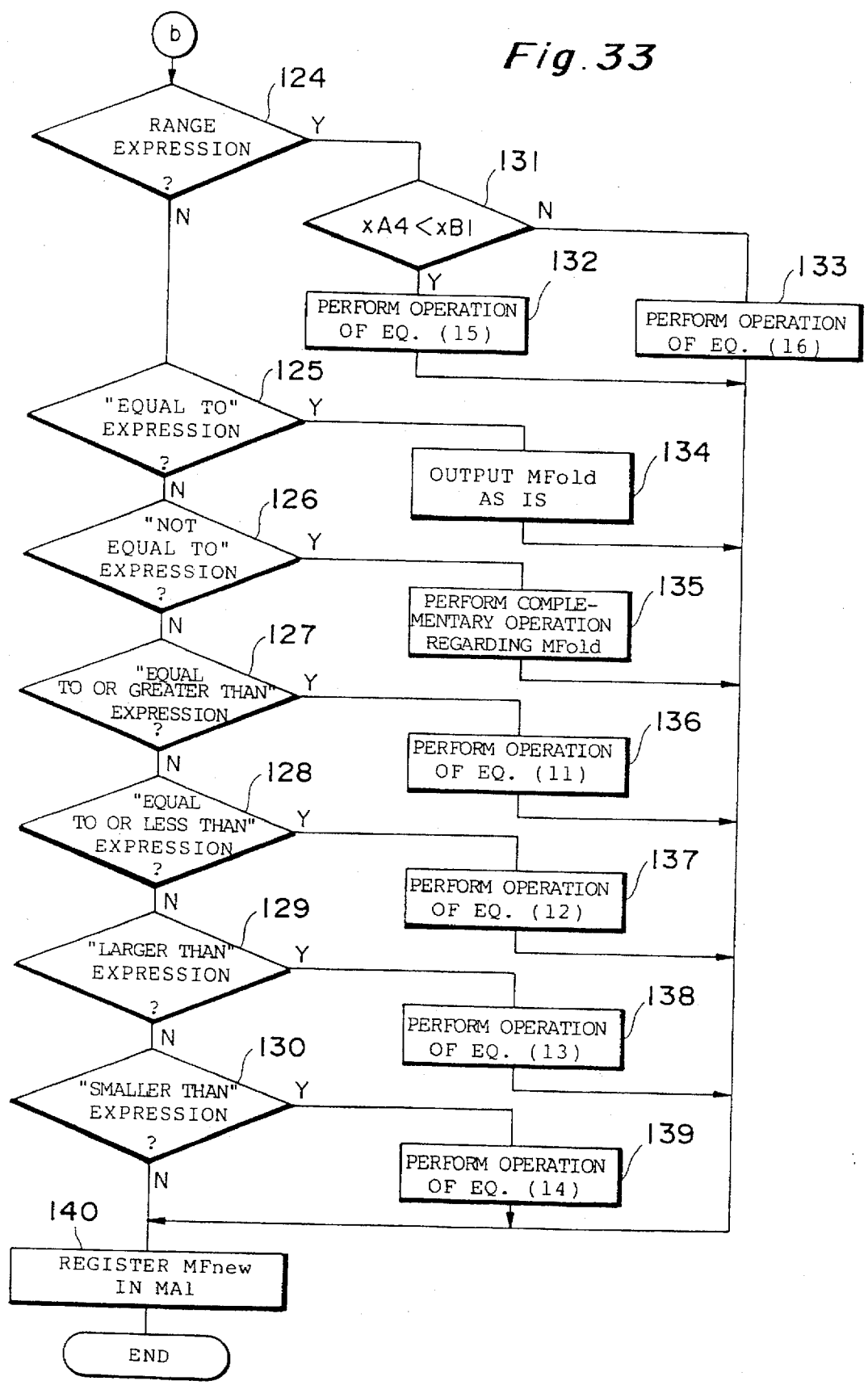

FIGS. 32 and 33 are flowcharts illustrating the procedure of processing for creating membership functions in the apparatus for creating membership functions.

The CPU 110 waits for entry of a fuzzy label and expression from the keyboard 113 (step 121). The fuzzy label is one type of symbol that specifies an existing membership function that has been stored in the area MA1 of the RAM 112. The expression mentioned here refers to an expression representing the various operators mentioned above.

When a fuzzy label and expression are entered by the operator manipulating the keyboard 113, the membership function corresponding to the entered fuzzy label is retrieved in the memory area MA1 of the RAM 112 (step 122) and this membership function is stored temporarily as MFold (step 123). Thereafter, the pointer corresponding to the operator that corresponds to the entered expression is retrieved in the memory area MA2 of the RAM 112 (steps 124~130), and an operation (steps 131~139) is performed for creating a new membership function MFnew using the temporarily stored MFold in accordance with the program accessed by the pointer corresponding to each operator.

In a case where the entered expression is a range expression, whether or not the two membership functions MFold A and MFold B overlap each other is determined by comparing the end point xA4 of the membership function MFold A and the end point xB1 of the membership function MFold B (step 131). In a case where xA4 is less than xB1, an operation is performed using Eq. (15) (step 132). In a case where xA4 is equal to or greater than xB1, an operation is performed in accordance Eq. (16) (step 133).

A new membership function MFnew created by the operation performed in steps 132~139 is registered in the memory area MA1 of RAM 112 in correspondence with the fuzzy label representing this membership function (step 140).

Thus, in accordance with this embodiment, an existing membership function and an operation program set beforehand are retrieved based upon the fuzzy label entered by the operator and the comparison expression or range expression regarding this fuzzy label, a new membership function is created in accordance with the operational program using this membership function, and the new membership function that has been created is registered in the memory area MA1. As a result, standardized membership-function creation can be performed automatically in conformity with the content of an expression, and a new membership function that has been created can be used as an existing membership function in the creation of another new membership function.

Industrial Applicability

A fuzzy retrieval apparatus and an apparatus for creating membership functions are manufactured in the computer industry and are used in all industries including the computer industry.

We claim:

1. An apparatus for creating membership functions, comprising:

a memory for storing data, which represents a membership function of a variable taken along a coordinate axis, in correlation with an identification number of the membership function;

a plurality of operating means for executing a predetermined operation for membership function creation, each of such predetermined operations creating a membership function according to the variable;

input means for entering an operation code representing a type of operation as well as an identification number of a membership function serving as a basis used in this operation; and control means for performing control so as to select an operating means that corresponds to an operation code entered by said input means, reading a membership function, which corresponds to said identification number of the membership function entered by said input means, out of the memory and causing the selected operating means to create a new membership function based upon the read membership-function data according to the predetermined operation.

2. An apparatus for creating membership functions according to claim 1, wherein said control means stores data representing a newly created membership function in the memory with its identification code allocated thereto.

3. An apparatus for creating membership functions according to claim 1, wherein said plurality of operating means includes first operating means for executing an operation represented by an operation code which means "equal to", said first operating means outputting the existing membership-function data read out of said memory as is as the new membership-function data.

4. An apparatus for creating membership functions according to claim 1, wherein said plurality of operating means includes second operating means for executing an operation represented by an operation code which means "unequal to", said second operating means executing a complementary operation to create the new membership-function data.

5. An apparatus for creating membership functions according to claim 1, wherein said plurality of operating means includes third operating means for executing an operation represented by an operation code which means "equal to or greater that", said third operating means executing the following operation;

$$MFnew \begin{cases} 0 & (x < x1) \\ MFold & (x1 \leq x \leq x2) \\ 1 & (x > x2) \end{cases}$$

where MFold represents the existing membership function represented by the data read out of said memory, MFnew represents the new membership function created by the operation, and x1 and x2 are variable values at points where membership function values change from zero to non-zero and from non-one to one, respectively, while the variable x is ascending.

6. An apparatus for creating membership functions according to claim 1, wherein said plurality of operating means includes fourth operating means for executing an operation represented by an operation code which means "equal to or less than", said fourth operating means executing the following operation;

$$MFnew \begin{cases} 1 & (x < x3) \\ MFold & (x3 \leq x \leq x4) \\ 0 & (x > x4) \end{cases}$$

Where MFold represents the existing membership function represented by the data read out of said memory, MFnew represents the new membership function created by the operation, and x3 and x4 are variable values at points where membership function values change from one to non-one and from non-zero to zero, respectively, while the variable x is ascending.

7. An apparatus for creating membership functions according to claim 1, wherein said plurality of operating means includes fifth operating means for executing an operation represented by an operation code which means "greater than", said fifth operating means executing the following operation;

$$MFnew \begin{cases} 1 & (x < x3) \\ 1 - MFold & (x3 \leq x \leq x4) \\ 1 & (x > x4) \end{cases}$$

Where MFold represents the existing membership function represented by the data read out of said memory, MFnew represents the new membership function created by the operation, and x3 and x4 are variable values at points where membership function values change from one to non-one and from non-zero to zero, respectively, while the variable x is ascending.

8. An apparatus for creating membership functions according to claim 1, wherein said plurality of operating means includes sixth operating means for executing an operation represented by an operation code which means "less than", said sixth operating means executing the following operation;

$$MFnew \begin{cases} 1 & (x < x1) \\ 1 - MFold & (x1 \leq x \leq x2) \\ 1 & (x > x2) \end{cases}$$

Where MFold represents the existing membership function represented by the data read out of said memory, MFnew represents the new membership function created by the operation, and x1 and x2 are variable values at points where membership function values change from zero to non-zero and from non-one to one, respectively, while the variable x is ascending.

9. An apparatus for creating membership functions according to claim 1, wherein said plurality of operating means includes seventh operating means for executing an operation represented by an operation code which means "between", said seventh operating means executing the following operation:

in a case where MFold A and MFold B are separated from each other;

$$MFnew = \begin{cases} 0 & (x < xA1) \\ MFold\,A & (xA1 \leq x \leq xA(\mu-max)) \\ \left(\mu A + \frac{\mu A(max) - \mu B(max)}{xA(\mu-max) - xB(\mu-max)}\right) \cdot x(MAX) \\ MFold\,A & (MAX)\,MFold\,B \\ & (xA(\mu-max) < x < xB(\mu-max)) \\ MFold\,B & (xB(\mu-max) \leq x \leq xB4) \\ 0 & (xB4 < x) \end{cases}$$

Where MFold A and MFold B represent the existing two membership functions represented by the data read out of said memory, MFnew represents the new membership function created by the operation, (MAX) is an operation for selecting the maximum value, $\mu A$ is the grade of MFold A, $\mu B$ is the grade of MFold B, $\mu a(max)$ is the maximum value of the grade of MFold A, $\mu b(max)$ is the maximum value of the grade of the MFold B, $xA(\mu-max)$ is the value of x that corresponds to grade $\mu A(max)$, and $\mu B(\mu-max)$ is the value of x that corresponds to grade $\mu B(max)$, xA1 is a variable value at a point where the grade $\mu A$ changes from zero to non-zero while the variable x is ascending, and xB4 is a variable value at a point where the grade $\mu B$ changes from non-zero to zero while the variable x is ascending, in a case where MFold A and MFold B overlap each other; MFnew=Mfold A (MAX) MFold B.

10. A method of creating membership functions comprising the steps of:

storing in advance, in a memory, data which represents a membership function of a variable taken along a coordinate axis, in correlation with an identification number of the membership function;

entering an operation code representing a type of operation as well as an identification number of a membership function serving as a basis used in this operation, each of said operations creating a membership function according to the variable; and reading a membership function, which corresponds to said identification number of the membership function entered, out of the memory and subjecting the membership function data that has been read out to the operation represented by the entered operation code to create a new membership function.

11. A method of creating membership functions according to claim 10 further comprising the step of storing data representing a newly created membership function in the memory with its identification code allocated thereto.

12. A method of creating membership functions according to claim 10 comprising the step of, in response to an input of an operation code which means "equal to", outputting the existing membership-function data read out of said memory as is as the new membership-function data.

13. A method of creating membership functions according to claim 10 comprising the step of, in response to an input of an operation code which means "unequal to", executing a complementary operation to create the new membership-function data.

14. A method of creating membership functions according to claim 10 comprising the step of, in response to an input of an operation code which means "equal to or greater than", executing the following operation;

$$MFnew \begin{cases} 0 & (x<x1) \\ MFold & (x1 \leq x \leq x2) \\ 1 & (x>x2) \end{cases}$$

Where MFold represents the existing membership function represented by the data read out of said memory, MFnew represents the new membership function created by the operation, and x1 and x2 are variable values at points where membership function values change from zero to non-zero and from non-one to one, respectively, while the variable x is ascending.

15. A method of creating membership functions according to claim 10 comprising the step of, in response to an input of an operation code which means "equal to or less than", executing the following operation;

$$MFnew \begin{cases} 1 & (x<x3) \\ MFold & (x3 \leq x \leq x4) \\ 0 & (x>x4) \end{cases}$$

Where MFold represents the existing membership function represented by the data read out of said memory, MFnew represents the new membership function created by the operation, and x3 and x4 are variable values at points where membership function values change from one to non-one and from non-zero to zero, respectively, while the variable x is ascending.

16. A method of creating membership functions according to claim 10 comprising the step of, in response to an input of an operation code which means "greater than", executing the following operation;

$$MFnew \begin{cases} 1 & (x<x3) \\ 1-MFold & (x3 \leq x \leq x4) \\ 1 & (x>x4) \end{cases}$$

Where MFold represents the existing membership function represented by the data read out of said memory, MFnew represents the new membership function created by the operation, and x3 and x4 are variable values at points where membership function values change from one to non-one and from non-zero to zero, respectively, while the variable x is ascending.

17. A method of creating membership functions according to claim 10 comprising the step of, in response to an input of an operation code which means "less than", executing the following operation;

$$MFnew \begin{cases} 1 & (x<x1) \\ 1-MFold & (x1 \leq x \leq x2) \\ 1 & (x>x2) \end{cases}$$

Where MFold represents the existing membership function represented by the data read out of said memory, MFnew represents the new membership function created by the operation, and x1 and change from zero to non-zero and from non-one to one, respectively, while the variable x is ascending.

18. A method of creating membership functions according to claim 10 comprising the step of, in response to an input of an operation code which means "between", executing the following operation:

in a case where MFold A and MFold B are separated from each other;

$$MFnew = \begin{cases} 0 & (x<xA1) \\ MFold\,A & (xA1 \leq x \leq \\ \left(\mu A + \dfrac{\mu A(\max)-\mu B(\max)}{xA(\mu-\max)-xB(\mu-\max)}\right) \cdot x(MAX) & xA(\mu-\max)) \\ MFold\,A & (MAX)\ MFold\,B \\ & (xA(\mu-\max) < \\ & x < xB(\mu-\max)) \\ MFold\,B & (xB(\mu-\max) \leq \\ & x \leq xB4) \\ 0 & (xB4 < x) \end{cases}$$

Where MFold A and MFold B represent the existing two membership functions represented by the data read out of said memory, MFnew represents the new membership function created by the operation, (MAX) is an operation for selecting the maximum value, µA is the grade of MFold A, µB is the grade of MFold B, µa (max) is the maximum value of the grade of MFold A, µb(max) is µa(max) is the maximum value of the grade of MFold A, µb(max) is the maximum value of the grade of MFold B, xA(µ-max) is the value of x that corresponds to grade µA(max), and xB(µ-max) is the value of x that corresponds to grade µB(max), xA1 is a variable value at a point where the grade µA changes from zero to non-zero while the variable x is ascending, and xB4 is a variable value at a point where the grade µB changes from non-zero to zero while the variable x is ascending, in a case where MFold A and MFold B overlap each other;
MFnew=MFold A (MAX) MFold B.

* * * * *